United States Patent [19]
Yoshida et al.

[11] Patent Number: 5,786,654
[45] Date of Patent: Jul. 28, 1998

[54] MOVABLE STAGE UTILIZING ELECTROMECHANICAL TRANSDUCER

[75] Inventors: Ryuichi Yoshida, Sakai; Yasuhiro Okamoto, Tondabayashi; Kenji Ishibashi, Izumi; Yasushi Tanijiri, Sakai; Hiroyuki Okada, Izumi, all of Japan

[73] Assignee: Minolta Co., Ltd., Osaka, Japan

[21] Appl. No.: 657,307

[22] Filed: Jun. 3, 1996

[30] Foreign Application Priority Data

| Jun. 8, 1995 | [JP] | Japan | 7-164572 |
| Jan. 23, 1996 | [JO] | Jordan | 8-027441 |
| Feb. 8, 1996 | [JP] | Japan | 8-045575 |
| Feb. 8, 1996 | [JP] | Japan | 8-045576 |
| Feb. 8, 1996 | [JP] | Japan | 8-045577 |
| Mar. 6, 1996 | [JP] | Japan | 8-075445 |

[51] Int. Cl.$^6$ .................................. H02N 2/04
[52] U.S. Cl. .......................... 310/328; 310/323
[58] Field of Search ........................... 310/323, 328, 310/344

[56] References Cited

U.S. PATENT DOCUMENTS

| 2,486,482 | 11/1949 | La Brie | 310/344 |
| 2,833,942 | 5/1958 | Ravich | 310/344 |
| 3,835,338 | 9/1974 | Martin | 310/328 |
| 4,195,243 | 3/1980 | Thaxter | 310/317 |
| 4,613,782 | 9/1986 | Mori et al. | 310/323 |
| 4,672,256 | 6/1987 | Okuno et al. | 310/323 |
| 4,947,077 | 8/1990 | Murata | 310/328 |
| 4,968,914 | 11/1990 | West et al. | 310/328 |
| 5,013,958 | 5/1991 | Ohnishi et al. | 310/323 |
| 5,134,335 | 7/1992 | Ikemoto et al. | 310/328 |
| 5,225,941 | 7/1993 | Saito et al. | 339/827 |
| 5,237,238 | 8/1993 | Berghaus et al. | 310/328 |
| 5,252,884 | 10/1993 | Dona | 310/328 |
| 5,260,622 | 11/1993 | West | 310/328 |
| 5,453,653 | 9/1995 | Zumeris | 310/323 |
| 5,589,723 | 12/1996 | Yoshida et al. | 310/328 |
| 5,640,063 | 6/1997 | Zumeris | 310/328 |

FOREIGN PATENT DOCUMENTS

| 57-38023 | 3/1982 | Japan | H03K 5/08 |
| 62-81984 | 4/1987 | Japan | 310/328 |
| 1-303361 | 12/1989 | Japan | 310/328 |

*Primary Examiner*—Thomas M. Dougherty
*Attorney, Agent, or Firm*—Burns, Doane, Swecker & Mathis, LLP

[57] ABSTRACT

A movable stage utilizing an electromechanical transducer. An actuator as a drive source thereof is composed of piezoelectric elements, drive member fixed thereto and a movable member friction-coupled with the drive member. When a drive pulse is applied to the piezoelectric element to cause it to show reciprocal displacements at different rates in the thickness direction, the movable member frictionally coupled with the drive member moves in the predetermined direction to move the movable table coupled with the movable member in the predetermined direction. The movable stage comprising the movable table moving in the two axes or three axes can be constituted by providing the actuator in the two axes or three axes crossing with each other.

27 Claims, 29 Drawing Sheets

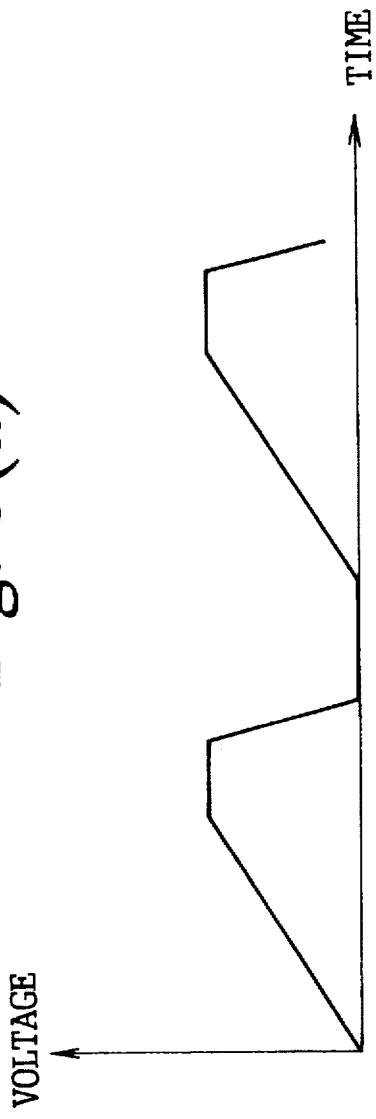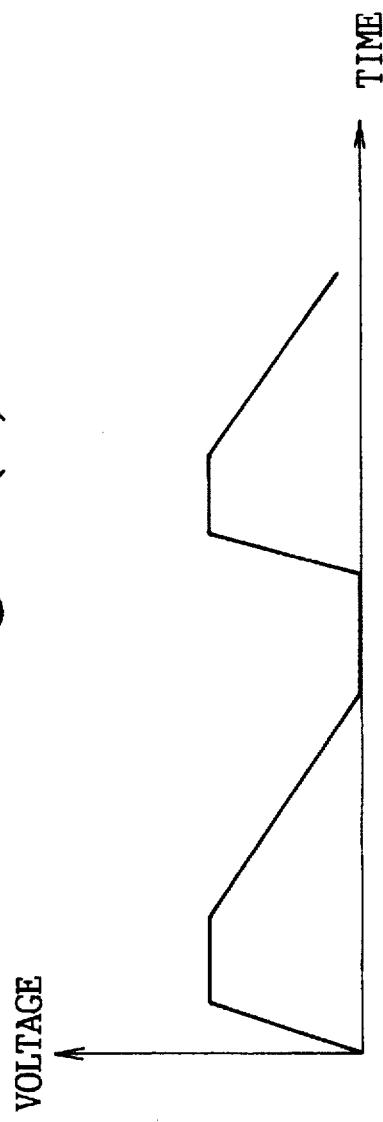

(W1=W2)

MOVABLE STAGE UTILIZING ELECTROMECHANICAL TRANSDUCER

BACKGROUND OF THE INVENTION

1. Field of the Invention

The present invention relates to a movable stage utilizing an electromechanical transducer element as a driving source and particularly to a movable stage utilizing an electromechanical transducer element that is suitable for high precision drive of XY table for high precision measurement, overhead projector, document carrier and stage of electron microscope.

2. Description of the Prior Art

For manufacturing and measurement of high precision parts, an X-axis stage for moving a table carrying object parts in the X-axis direction and an XY stage for moving such parts in the X-Y plane with higher accuracy are widely utilized. The typical movable table of this type has a constitution that a guide means is provided on a supporting board to guide the table in the X-direction and Y-direction and the table is moved in the X-direction and Y-direction along the guide with a micrometer utilizing a feed screw produced with high accuracy.

As a movable stage of this type, a movable stage is very popular, wherein a pulse motor is used for driving a micrometer and is also used for detecting a rotating angle of high precision feed screw with an encoder in order to detect position.

Moreover, it is also known that a linear motor is also used for movement of the table and thereby the table can be moved directly. In this case, position of table can be detected with a linear encoder.

Moreover, it is also proposed for a semiconductor device manufacturing apparatus to introduce the constitution that a wafer is supported with a supporting member driven by a piezoelectric element and proper drive pulse is supplied to the piezoelectric element to give a certain displacement so that the wafer is aligned with an exposure mask (refer to the Japanese Laid-Open Patent Application No. Sho 57-38023).

Here, the movable stage utilizing the micrometer introduces a feed screw for movement of the table and therefore it is not suitable for positioning in units of a submicron because of unavoidable errors due to backlash of the feed screw. Moreover, in a micrometer which is driven with a pulse motor, a reduction gear mechanism is provided between the pulse motor and feed screw. However, in this case, additional back-lash of the reduction gear mechanism results in not only such a disadvantage as deterioration of moving accuracy but also a constitution not suitable for high speed movement. In addition, projection toward the outside of the movable stage to a large extent of pulse motor and reduction gear mechanism makes difficult a reduction in size of the movable stage.

Use of linear motor for movement of table assures reduction in size more easily than use of micrometer introducing the feed screw. However, in this case, a current must also be supplied to a coil for maintaining the table in the stationary condition and such stationary condition must be sustained by keeping the balance of the current. Therefore, it is difficult to ensure the stabilized stationary condition and moreover use of parts which dislike magnetism must be avoided because a magnetic field is generated near the table.

Moreover, a moving mechanism utilizing a piezoelectric element for alignment of wafer and exposing mask becomes large in size because of use of pneumatic device for coupling between the wafer and supporting member to be driven with the piezoelectric element, bringing about a disadvantage that it is difficult to design the apparatus to be small in size.

SUMMARY OF THE INVENTION

It is a principal object of the present invention to provide a novel movable stage which can drive a table with high accuracy by utilizing an electro-mechanical transducer.

It is another object of the present invention to provide a novel movable stage which can locate and drive the table with higher accuracy and higher speed than the movable stage of the prior art utilizing a mechanical driving mechanism such as a reduction gear mechanism.

It is further object of the present invention to provide a novel movable stage which can move the table in the crossing 2-axis or 3-axis direction.

It is still further object of the present invention to provide a novel movable stage which can be used even under the severe environmental conditions such as high humidity condition or in the water.

The other objects of the present invention will become more apparent from the following detailed description of the invention referring to the accompanying drawings.

BRIEF DESCRIPTION OF THE DRAWINGS

FIG. 3(a) and FIG. 3(b) are diagrams for explaining waveforms of drive pulses to be applied to a piezoelectric element.

DETAILED DESCRIPTION OF THE PREFERRED EMBODIMENTS

Figure 1:
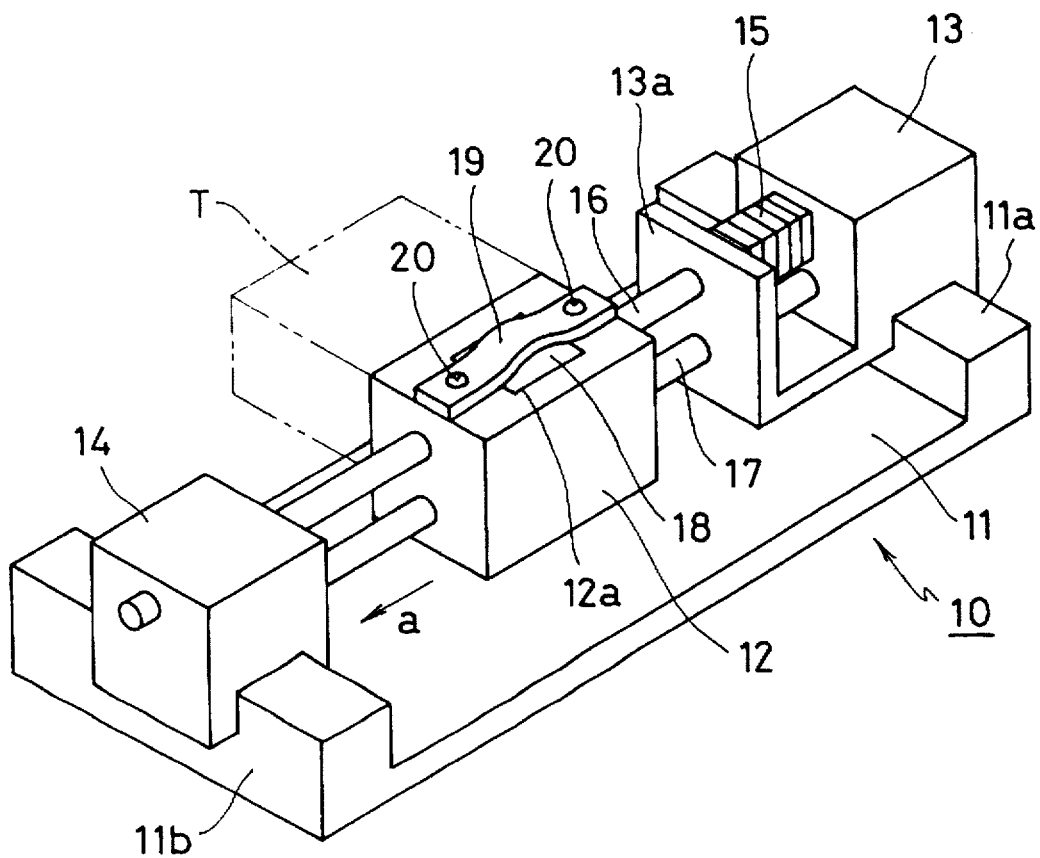
FIG. 1 is a perspective view illustrating a constitution of an impact type actuator used in the first embodiment of the present invention.

The preferred embodiments of the present invention will be explained hereunder in detail. First, the first embodiment of the present invention will be explained. FIG. 1 is a perspective view illustrating a constitution of an impact type actuator to be used in the first embodiment of the present invention. The actuator to be used as the driving mechanism in the second to fifth embodiments explained later is also provided with a similar constitution.

In FIG. 1, the reference numeral 11 designates a frame and numerals 13, 14, supporting blocks respectively attached to the members 11a, 11b of the frame 11. 16 designates a drive shaft supported to be movable in the axial direction by a bearing 13a integrally formed with the supporting block 13 and the supporting block 14. 15 is a piezoelectric element, one end of which is stationarily coupled with the supporting block 13, while the other end is stationarily coupled with one end of the drive shaft 16 so that displacement in the thickness direction of the piezoelectric element 15 causes the drive shaft 16 to be displaced in the axial direction (direction of arrow (a) and opposite direction thereof).

Figure 2:
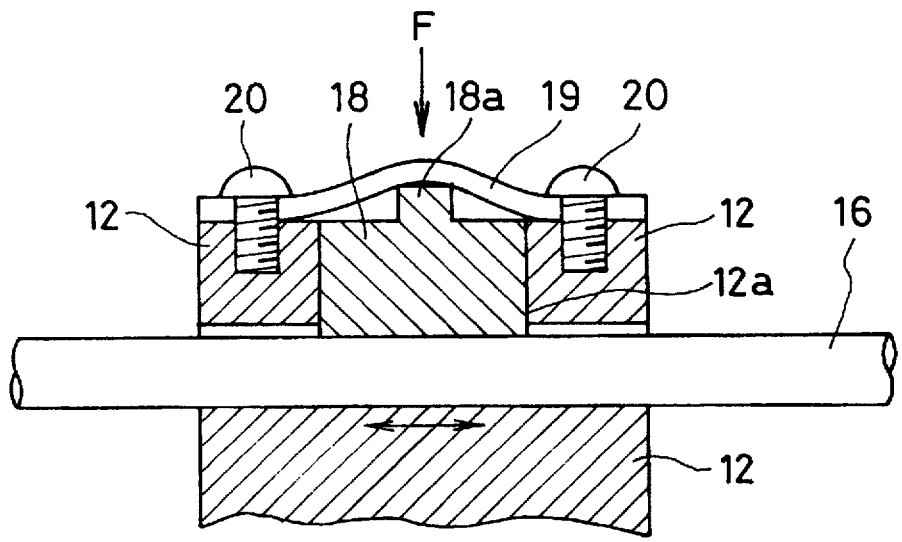
FIG. 2 is an enlarged cross-sectional view of friction contact area of the impact type actuator shown in FIG. 1.

12 designates a slider block allowing the drive shaft 16 to be provided therethrough in the horizontal direction. An aperture 12a is formed at the upper portion where the drive shaft 16 of the slider block 12 is provided therethrough, exposing the upper half of the drive shaft 16. Moreover, the aperture 12a permits insertion there into of a pad 18 which is pressed in contact with the upper half of the drive shaft 16a, the pad 18 is provided at its upper part with a projection 18a, the projection 18a of the pad 18 is pushed downward by a plate spring 19 and the pad 18 is pressurized in contact with the drive shaft 16 with a given downward energizing force F. FIG. 2 is a cross-sectional view of the constitution of the contact area among the drive shaft 16, slider block 12 and pad 18.

17 designates a guide shaft for preventing swaying of the slider block 12 to assure smooth movement thereof when the slider block 12 moves in the axial direction together with the drive shaft 16 and 20 designates a screw for fixing the plate spring 19 to the slider block 12.

With the constitution explained above, the slider block 12 including the pad 18 and the drive shaft 16 are pressurized and friction-coupled with each other with an energizing force F of the plate spring 19.

Next, operations will be explained. First, when a sawtooth wave drive pulse having a gradual rising part and a sharp falling part as shown in FIG. 3(a) is applied to the piezoelectric element 15, the gradual rising part of the drive pulse causes the piezoelectric element 15 to show gradual expanding displacement in the thickness direction, also causing the drive shaft 16 coupled with the piezoelectric element 15 to gradually displace in the positive direction. In this case, the slider block 12 friction-coupled with the drive shaft 16 is moved in the positive direction (direction of arrow a) together with the drive shaft 16 by a friction-coupling force.

Next, the sharp falling part of the drive pulse causes the piezoelectric element 15 to quickly show compressing displacement in the thickness direction, also causing the drive shaft 16 coupled with the piezoelectric element 15 to quickly show displacement in the negative direction. In this case, the slider block 12 friction-coupled with the drive shaft 16 overcomes the friction-coupling force with its inertia force to substantially remain at its position and does not move. When the drive pulse is continuously applied to the piezoelectric element 15, the slider block 12 can be moved continuously in the positive direction (direction of arrow a).

Here, the term "substantial" used above can also be applied to the movement of the slider block 12 as a whole in the direction of arrow a due to the difference of drive time because sliding is generated at the friction-coupling surfaces between the slider block 12 and drive shaft 16 even in any direction of the positive direction (direction of arrow mark a) and opposite direction thereto.

Movement of the slider block in the direction opposed to the above direction (opposite direction to the arrow a) can be realized by changing the waveform of the sawtooth drive pulse to be applied to the piezoelectric element 15, that is, by applying the drive pulse having the sharp rising part and gradual falling part as shown in FIG. 3(b).

The X-axis movable stage which moves in the X direction with higher accuracy can be constituted by fixing the table T (refer to FIG. 1) to the slider block 12.

Here, the slider block 12 and drive shaft 16 are friction-coupled and when the drive shaft 16 is in the stationary condition, the slider block 12 is fixed at the drive shaft 16 with a friction force. Therefore, the slider block 12 is not required to provide a mechanism for holding the table T at the stop position.

Figure 4:
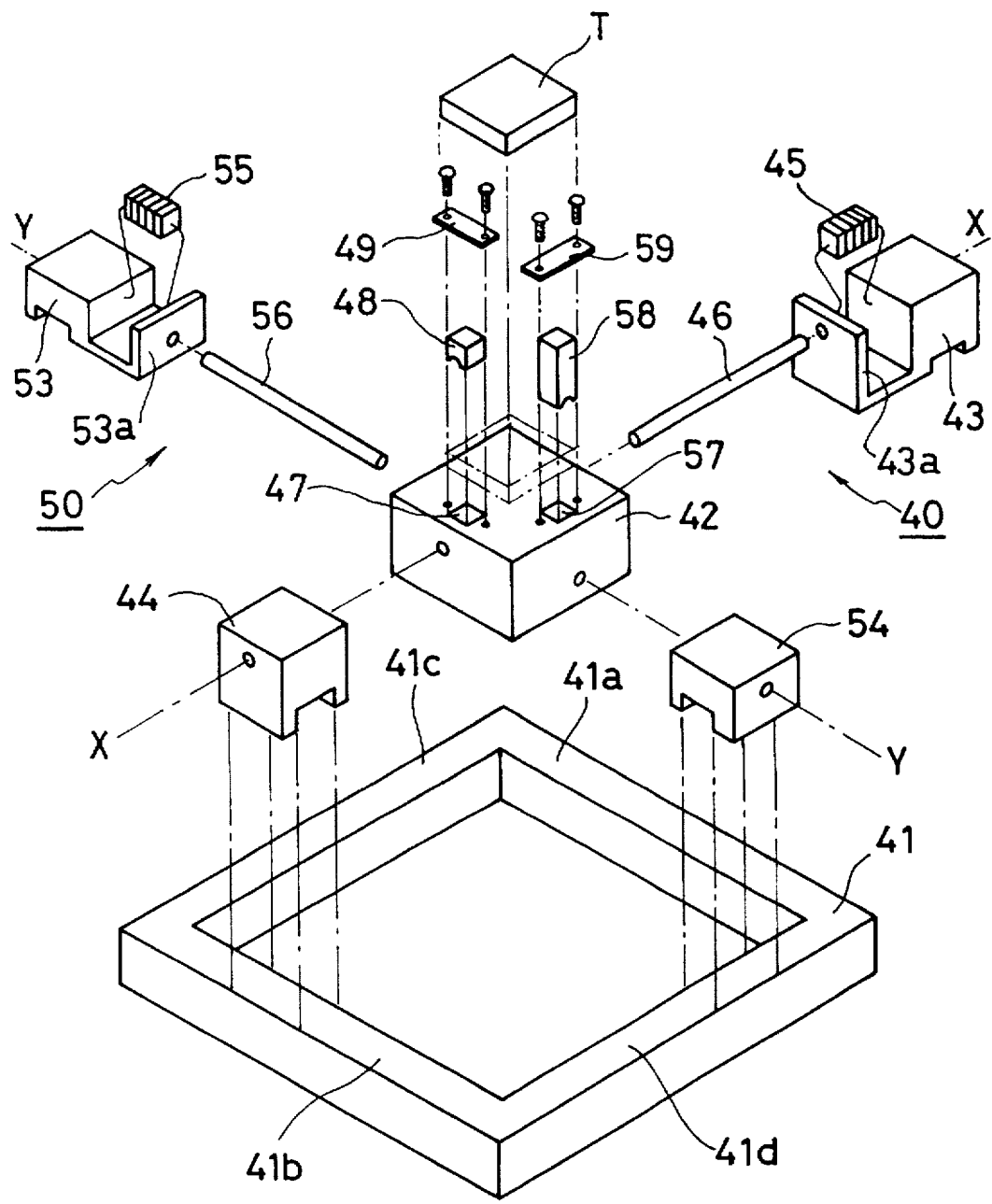
FIG. 4 is a perspective view of disassembled constitution of an X-Y axis movable stage of the second embodiment which can be moved in both X- and Y-axis directions.
Figure 5:
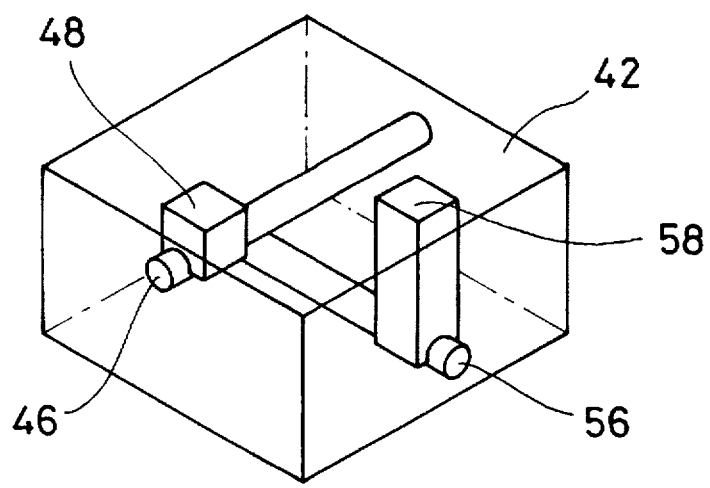
FIG. 5 is a perspective view of a slider block portion of the X-Y axis movable stage shown in FIG. 4.
Figure 6:
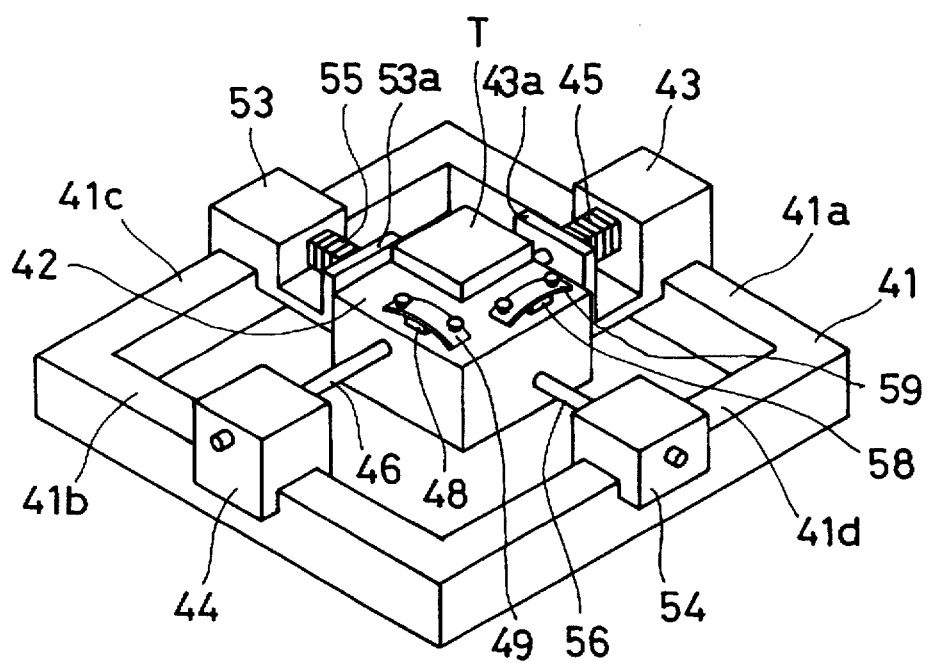
FIG. 6 is a perspective view illustrating the assembling condition of the X-Y axis movable stage shown in FIG. 4.

FIG. 4 to FIG. 6 show a constitution of the X-Y axis movable stage of the second embodiment of the present invention. FIG. 4 is a perspective view illustrating the disassembled condition. FIG. 5 is a perspective view illustrating layout of the drive shaft and pad at the slider block area. FIG. 6 is a perspective view illustrating the assembled condition.

In FIG. 4, 41 designates a frame where members 41a, 41b and members 41c, 41d forming each side are accurately arranged in parallel and the members 41a to 41d are also arranged with each other accurately crossing at the right angle with the adjacent members. 42 designates a slider block on which a table T for placing items to be moved is fixed by adequate means such as a screw, etc.

The actuator 40 in the X-axis direction is formed, slidably on the members 41a and 41b of the frame 41, of the supporting blocks 43, 44, piezoelectric element 45, drive shaft 46, slider block 42, pad 48 and plate spring 49 which are coupled without any looseness. The drive shaft 46 is supported, movable in the axial direction, by the bearing 43a which is integrally formed with the supporting block 43 and by the supporting block 44. Moreover, one end of the piezoelectric element 45 is bonded for fixing to the supporting block 43, while the other end is bonded for fixing to one end of the drive shaft 46, thereby the drive shaft 46 can be displaced in the X-axis direction with the displacement of the piezoelectric element 45 in the thickness direction.

Moreover, the actuator 50 in the Y-axis direction is formed, slidably on the members 41c and 41d of the frame 41, of the supporting blocks 53 and 54, piezoelectric element 55, drive shaft 56, slider block 42, pad 58 and plate spring 59 which are coupled without any looseness. The drive shaft 56 is supported, movable in the axial direction, by the bearing 53a integrally formed with the supporting block 53 and by the supporting block 54. Moreover, one end of the piezoelectric element 55 is bonded for fixing to the supporting block 53, while the other end is bonded for fixing to one end of the drive shaft 56, thereby the drive shaft 56 can be displaced in the Y-axis direction with the displacement of the piezoelectric element 55 in the thickness direction.

FIG. 5 is a perspective view illustrating a constitution of the crossing portion of the drive shaft 46 and drive shaft 56 in the slider block 42. The drive shaft 46 for the X-axis direction is provided at the upper side, while the drive shaft 56 for the Y-axis direction at the lower side. The pad 48 is pressurized in contact with the upper half of the drive shaft 46 for the purpose of friction contact, while the pad 58 is pressurized in contact with the upper half of the drive shaft 56 for the purpose of friction contact. The constitutions and functions of the friction contact area of the X-axis direction actuator 40 formed of the slider block 42, drive shaft 46, pad 48 and plate spring 49 and the friction contact area of the Y-axis direction actuator 50 formed of the slider block 42, drive shaft 56, pad 58 and plate spring 59 are not explained in detail because such constitutions and functions are identical to that of the actuator explained in regard to FIG. 1 and FIG. 2.

In the X-Y axis movable stage shown in FIG. 4 to FIG. 6, the drive shaft 46 in the X-axis direction and drive shaft 56 in the Y-axis direction are provided through the slider block 42 and these drive shafts never sway when the slider block 42 moves. Therefore the mechanism corresponding to the guide shaft 17 in the first embodiment of FIG. 1 is not provided.

Figure 7:
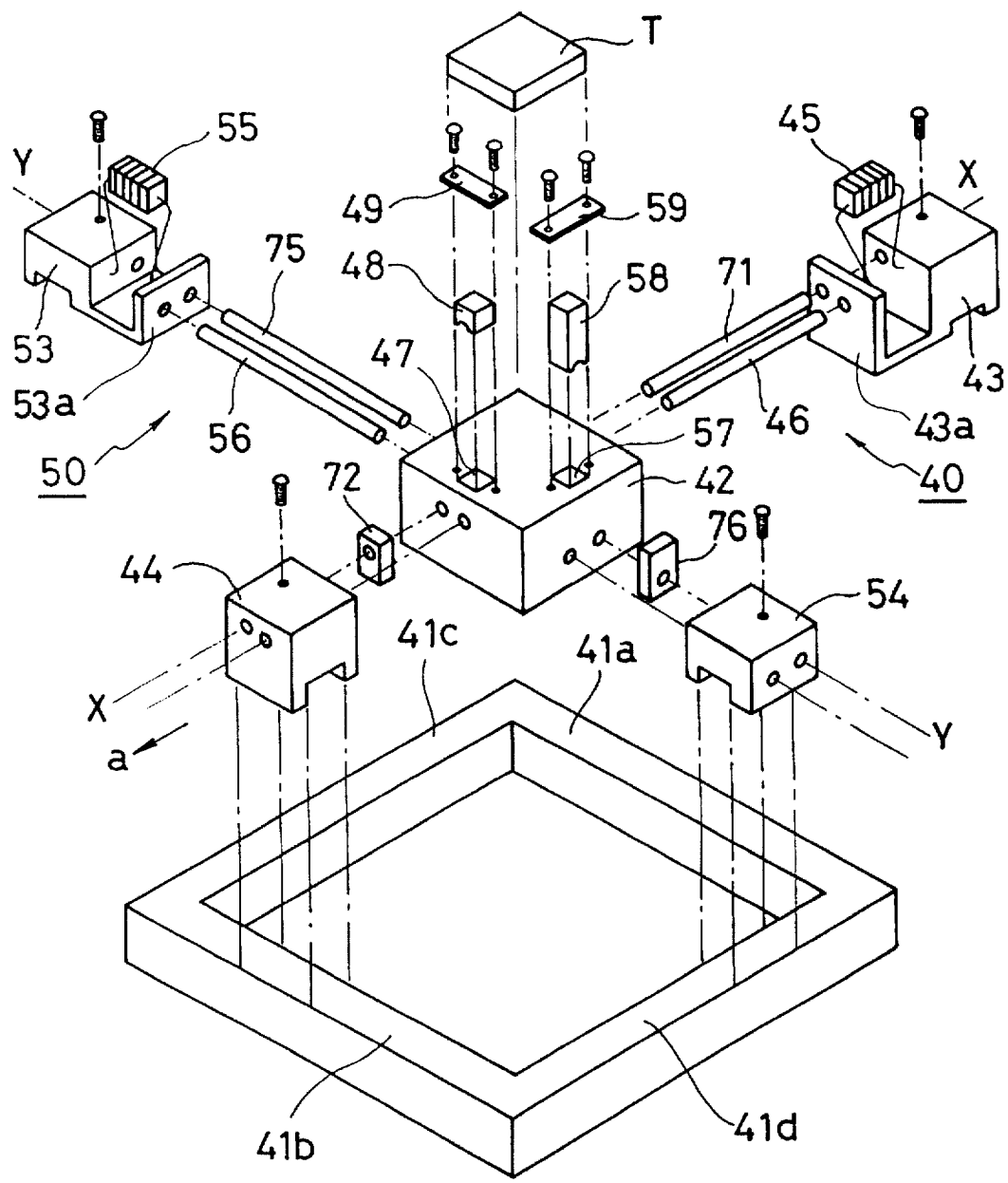
FIG. 7 is a perspective view of disassembled constitution of the third embodiment wherein a table position detecting apparatus is added to the X-Y axis movable stage.
Figure 8:
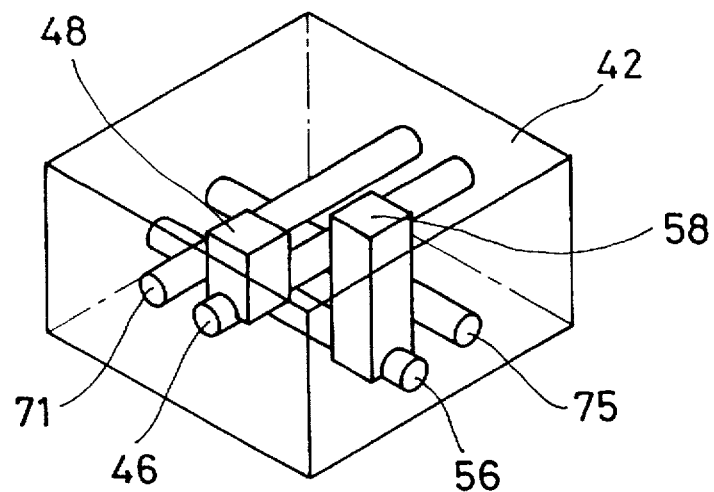
FIG. 8 is a perspective view of a slider block portion of the X-Y axis movable stage shown in FIG. 7.
Figure 9:
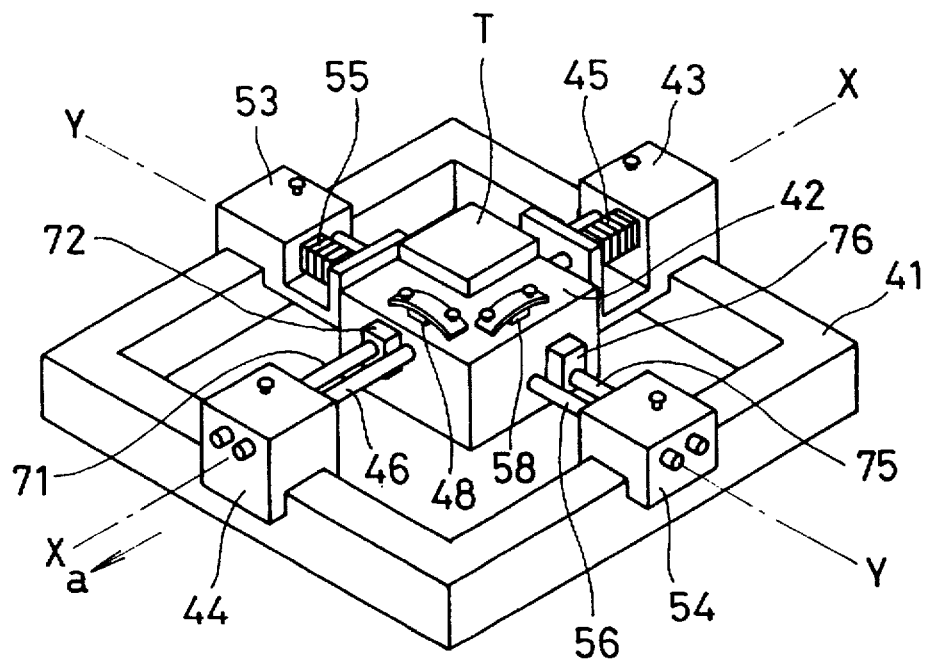
FIG. 9 is a perspective view illustrating the assembled constitution of the X-Y axis movable stage shown in FIG. 7.

FIG. 7 to FIG. 9 illustrate a constitution of the X-Y axis movable stage of the third embodiment of the present invention, wherein a position detector for detecting the position in the X-axis direction and Y-axis direction of the table T, that is, slider block 42 is provided in the X-Y axis movable stage of the second embodiment explained with reference to FIG. 4 to FIG. 6.

Of the constitution of the X-Y axis movable stage, the portion same as the constitution of the second embodiment illustrated in FIG. 4 to FIG. 6 are designated by the same reference numeral and is not explained here. Only the position detector is explained here.

The position detector utilizes a well known position detector (MR sensor) consisting of a magnetization rod magnetized as the NS poles in the constant interval λ and a magneto-resistance element which is located near the magnetization rod for detecting magnetism of the magnetization rod. Resolution of the position detector is determined by the interval λ between NS poles of the magnetization rod and position of the slider block can be detected with the accuracy of λ/4.

In FIG. 7 to FIG. 9, numeral 71 designates a magnetization rod located between the supporting blocks 43 and 44 in parallel to the drive shaft 46 and fixed to the supporting blocks 43 and 44, and 72, a magneto-resistance element located near the magnetization rod 71 for determining the position of the slider block 42 in the X-axis direction by detecting magnetism of the magnetization rod 71. The magnetization rod 71 and the magneto-resistance element 72 form the X-axis direction position detector (MR sensor) 73 (refer to FIG. 10). Moreover, numeral 75 designates a magnetization rod located between the supporting blocks 53 and 54 in parallel to the drive shaft 56 and fixed to the supporting blocks 53 and 54, and 76, a magneto-resistance element located near the magnetization rod 75 for determining the position of the slider block 42 in the Y-axis direction by detecting magnetism of the magnetization rod 75. The magnetization rod 75 and magneto-resistance element 76 form the Y-axis direction position detector (MR sensor) 77 (refer to FIG. 10).

FIG. 8 is a perspective view illustrating a constitution of the coupling portion of the drive shaft 46, magnetization rod 71, drive shaft 56 and magnetization rod 75 in the slider block 42. The X-axis direction drive shaft 46 and magnetization rod 71 are located at the upper position, while the Y-axis direction drive shaft 56 and magnetization rod 75 are at the lower position. The constitutions and functions of the friction contact area of the X-axis direction actuator 40 formed of the drive shaft 46, pad 48 and plate spring 49 and the friction contact area of the Y-axis direction actuator 50 formed of the drive shaft 56, pad 58 and plate spring 59 are not explained in detail because such constitutions and functions are identical to that of the actuator explained in regard to FIG. 1 and FIG. 2.

When the X-axis direction actuator 40 operates but the Y-axis direction actuator 50 does not operate, the supporting blocks 43 and 44 of the X-axis direction actuator 40 coupled with the frame 41 remain at its position, but the supporting blocks 53 and 54 of the Y-axis direction actuator 50 respectively slide in the X-axis direction on the members 41c and 41d of the frame 41, not hindering movement of the slider block 42 in the X-axis direction.

When the Y-axis direction actuator 50 operates but the X-axis direction actuator 40 does not operate, the supporting blocks 53 and 54 of the Y-axis actuator 50 coupled with the frame 41 remain at its position, but the supporting blocks 43 and 44 of the X-axis actuator 40 respectively slide in the Y-axis direction on the members 41a and 41b of the frame 41, not hindering movement of the slider block 42 in the Y-axis direction.

When both X-axis direction actuator 40 and Y-axis direction actuator 50 operate simultaneously, the supporting blocks 43 and 44 of the X-axis direction actuator 40 slide in the Y-axis direction on the members 41a and 41b of the frame 41, while the supporting blocks 53 and 54 of the Y-axis direction actuator 50 slide in the X-axis direction on the members 41c and 41d of the frame 41, thereby assuring free movement of the slider block 42 in the XY plane.

Moreover, when the actuators 40 and 50 are driven or when the slider block 42 moves with an external force applied to the table T, the supporting blocks 43, 44 and the supporting blocks 53, 54 can slide freely in the direction orthogonally crossing the moving direction of the operating drive shafts 46, 56. Therefore, only the force in the moving direction of the drive shaft is applied to the coupling portion between the drive shaft and piezoelectric element and between the piezoelectric element and supporting blocks and such a shearing force as separating the coupling is never applied thereto.

Figure 10:
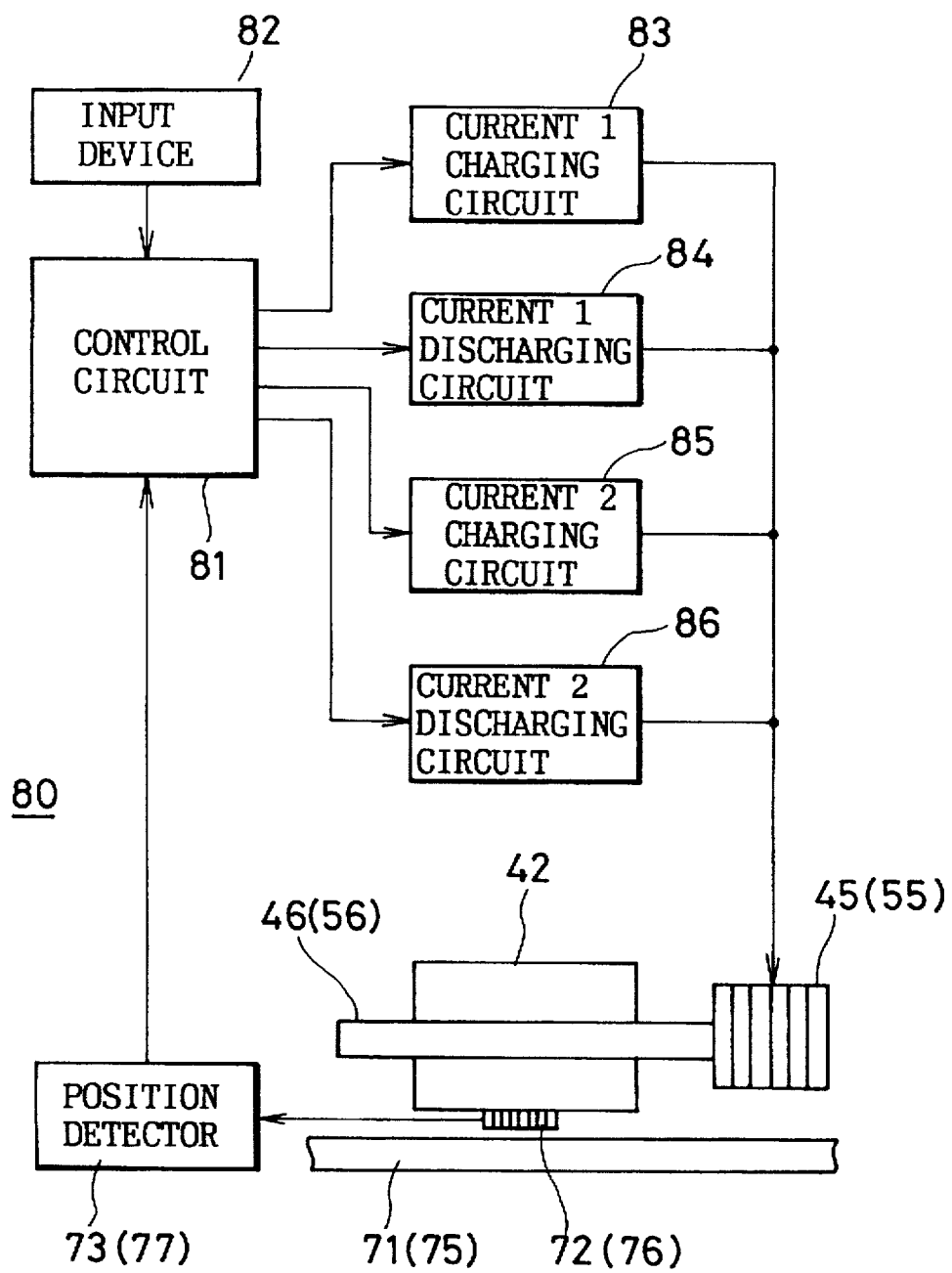
FIG.10 is a block diagram of a drive circuit for driving a piezoelectric element of the X-Y axis movable stage.

FIG. 10 is a block diagram of a drive circuit for driving the piezoelectric element of the X-Y axis movable stage explained above. The drive circuit 80 drives the piezoelectric element 45 (55) through charging and discharging with two kinds of current 1 and current 2 (current 1>current 2) in different amplitudes. Driving with two kinds of currents in different amplitudes causes the piezoelectric element 45 (55) to expand or compress in different rates.

Figure 11:
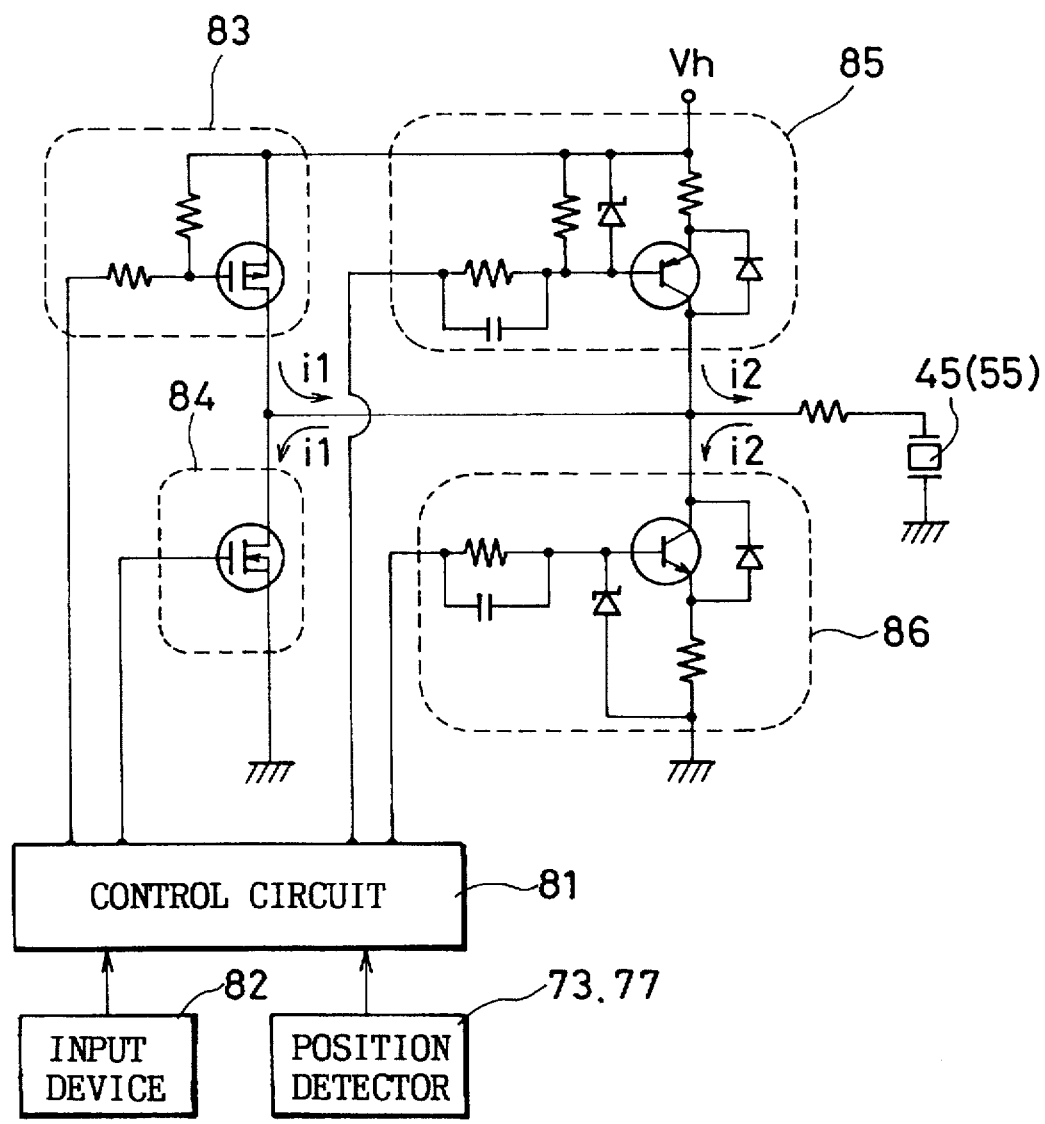
FIG. 11 is a circuit diagram illustrating the current 1 charging circuit, current 1 discharging circuit, current 2 charging circuit and current 2 discharging circuit used in the drive circuit shown in FIG. 10.

The drive circuit 80 comprises the control circuit 81, input device 82 for inputting the target position for moving the slider block 42 in the both X- and Y-directions, current 1 charging circuit 83, current 1 discharging circuit 84, current 2 charging circuit 85, current 2 discharging circuit 86 and position detectors 73 and 77 for detecting the current position of the slider block 42 in the X- and Y-axis directions. FIG. 11 shows examples of the current 1 charging circuit 83, current 1 discharging circuit 84, current 2 charging circuit 85 and current 2 discharging circuit 86.

The current 1 charging circuit 83 quickly charges the piezoelectric element 45 (55) with a large current. When the current 1 charging circuit 83 operates, the piezoelectric element 45 (55) quickly shows extending displacement. Meanwhile, the current 1 discharging circuit 84 quickly discharges the piezoelectric element 45 (55) with a large current. When the current 1 discharging circuit 84 operates, the piezoelectric element 45 (55) quickly shows compressing displacement.

Moreover, since the current 2 charging circuit 85 is a constant current charging circuit and gradually charges the piezoelectric element 45 (55) with a current lower than the current used for the current 1 charging circuit 83, when the current 2 charging circuit 85 operates, the piezoelectric element 45 (55) gradually shows extending displacement. Meanwhile, since the current 2 discharging circuit 86 is a constant current discharging circuit and gradually discharges the piezoelectric element 45 (55) with a current lower than the current used for the current 1 discharging circuit 84, when the current 2 discharging circuit 86 operates, the piezoelectric element 45 (55) gradually shows compressing displacement. Here, the current 2 charging circuit 85 is formed as a constant current charging circuit while the current 2 discharging circuit 86 as a constant current discharging circuit because, as will be apparent from the driving principle, the moving member can be moved, when the piezoelectric element 45 (55) is caused to gradually show extending or compressing displacement, at a higher speed by displacing the piezoelectric element at the speed as equal as possible.

Driving operation of the X-Y axis stage utilizing the drive circuit 80 explained above will then be described with reference to FIG. 7, FIG. 9, FIG. 10 and FIG. 11. Since the X-axis direction actuator 40 and the Y-axis direction actuator 50 operate in the same manner, operation of only the X-axis direction actuator will be explained, omitting the description of the operations of the Y-axis direction actuator 50.

First, operation for moving the table, namely, the slider block 42 to the predetermined position in the direction of arrow a on the X-axis (refer to FIG. 9) will be explained. As the moving operation, the coarse moving is conducted initially and then fine moving is conducted after the table is approximated to the target position for the final setting of the table to the predetermined position.

Figure 12A:
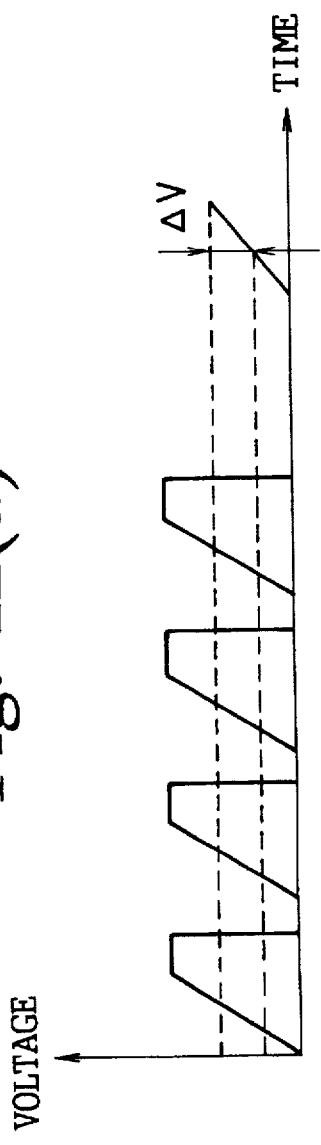
FIG. 12(a) and FIG. 12(b) are diagrams for explaining waveforms of the drive pulses to be applied to the piezoelectric element and moving condition of the X-Y axis movable stage.

Since the coarse moving of the slider block 42 in the direction of arrow a on the X-axis can be realized by giving gradual extending displacement in the direction of arrow a and quick compressing displacement in the direction opposed to the direction of arrow a to the piezoelectric element 45, the current 2 charging circuit 85 and the current 1 discharging circuit 84 are selectively operated to apply the drive pulse including the gradual rising waveform and subsequent quick falling waveform as shown in FIG. 12(a) to the piezoelectric element 45. Thereby, the piezoelectric element 45 shows gradual extending displacement in the direction of arrow a and quick compressing displacement in the direction opposed to the direction of arrow a to move the slider block 42 in the direction of arrow a through the drive shaft 46.

Next, fine moving of the slider block 42 will then be explained with reference to FIG. 12(b). Moving of the slider block 42 in the direction of arrow b is continued by continuously applying the drive pulse. During this process, the moving is switched to the fine moving when difference d1 between the current position (coarse moving stop position) p of the slider block 42 detected by the X-axis direction position detector 73 and the target position m becomes smaller than the average distance y in which the slider block 42 moves with one drive pulse (d1<y).

Here, the average distance y should preferably be determined by previously obtaining average moving distance from a plurality of drive pulses because the moving distance of the slider block by only one drive pulse includes fluctuation.

During the fine moving of slider block, a voltage which gradually rises is applied to the piezoelectric element 45 to move the slider block 42 up to the scale graduation position s of the position detector 73 located nearest the target position before the target position m. Next, a voltage $\Delta v$ which gradually rises (refer to FIG. 12(a)) is applied to the piezoelectric element 45 to generate displacement in the thickness direction corresponding to the difference d2 between the current position (scale graduation position) s and the target position.

In this fine moving operation, since a voltage which rises gradually is applied to the piezoelectric element 45, the slider block 42 can be set accurately to the target position m without generation of any slip between the drive shaft and slider block. During this fine moving operation, the voltage $\Delta v$ corresponding to the difference d2 between the current position (scale graduation position) s and the target position to be applied to the piezoelectric element 45 can be determined easily by storing a parameter obtained by previously searching relationship between the voltage to be applied to the piezoelectric element and generated displacement into the control circuit 81.

Since the moving of the slider block 42 to the predetermined position in the direction opposed to the arrow a on the X-axis can be realized by giving, to the piezoelectric element 45, quick compressing displacement in the direction of arrow a and gradual extending displacement in the direction opposed to the arrow a, the current 1 charging circuit 83 and the current 2 discharging circuit 86 are operated selectively, causing the piezoelectric element 45 to quickly charge and thereafter gradually discharge. Thereby, the piezoelectric element 45 generates quick extending displacement in the direction of arrow a and gradual compressing displacement in the direction opposed to the direction of arrow a, enabling the slider block 42 to move in the direction opposed to the direction of arrow a through the drive shaft 46.

In this case, the moving operation of stage starts also with the coarse moving and ends with the fine moving, after reaching the area near the target position, for setting to the predetermined position.

Figure 12B:
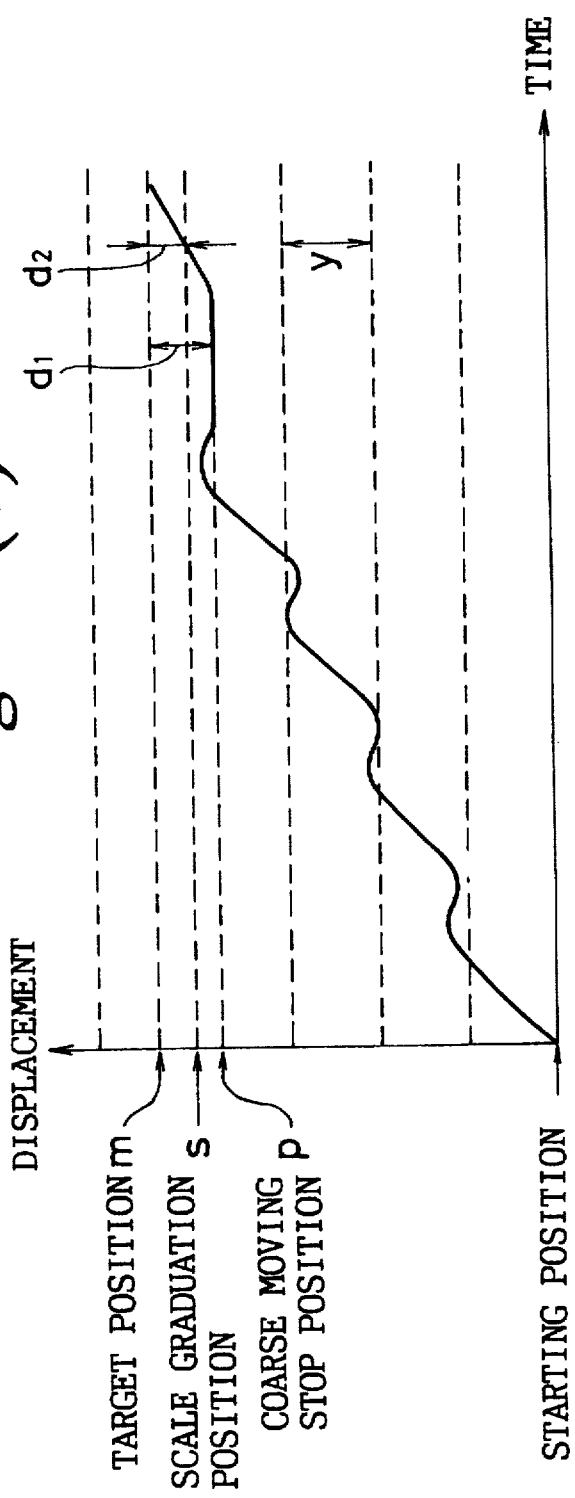

In the moving operation explained above, moving of the slider block to the target position starts with the coarse moving as shown in FIG. 12(b). This coarse moving is switched to the fine moving before the target position for making access to the target position.

Figure 13:
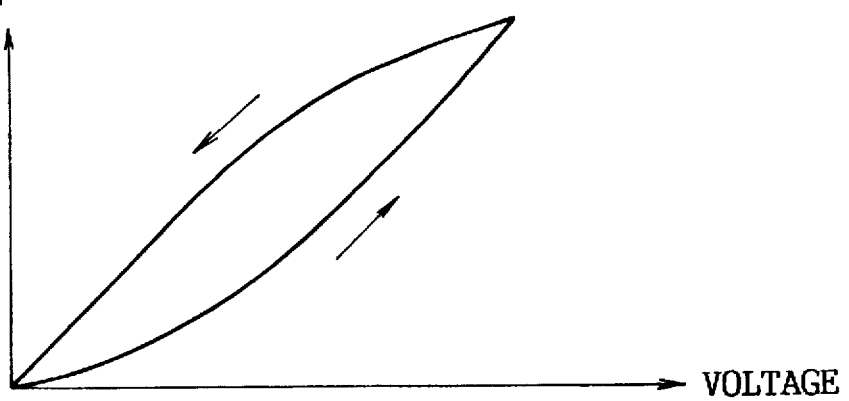
FIG. 13 is a diagram for explaining hysteresis characteristic of the piezoelectric element.
Figure 14A:
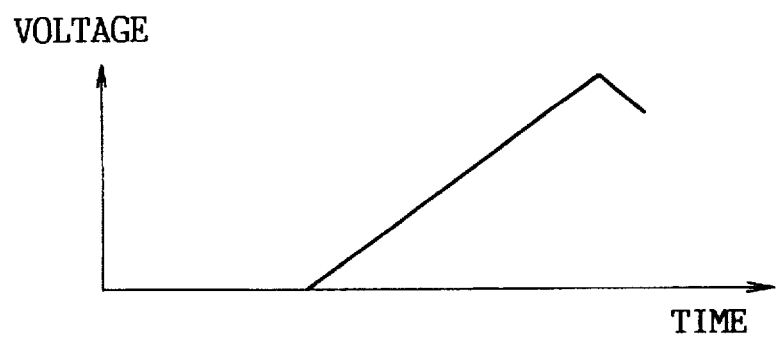
FIG. 14(a) and FIG. 14(b) are are diagrams for explaining voltage to be applied to the piezoelectric element and moving condition of X-Y axis movable stage.
Figure 14B:
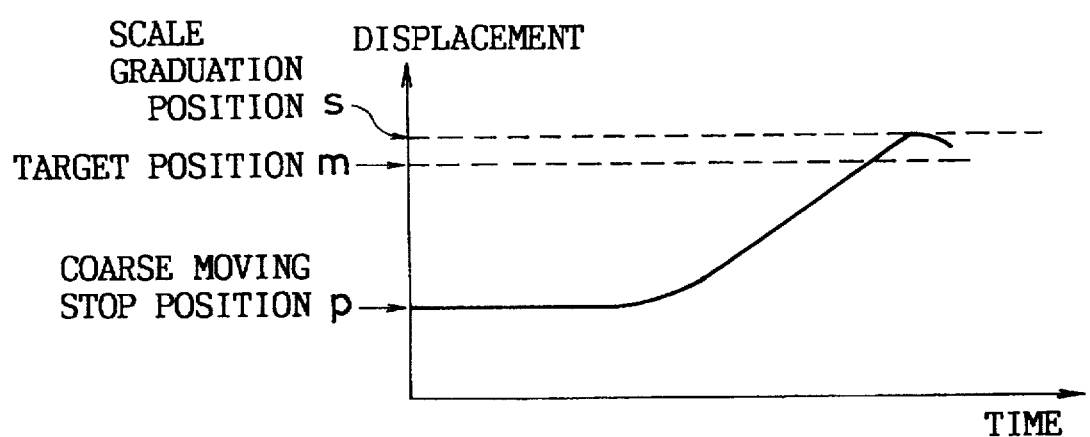

This approach is necessary for moving the slider block with higher accuracy to the target position. Namely, as shown in FIG. 13, since the piezoelectric element has the hysteresis characteristic between change of voltage supplied and displacement, when the moving operation starts with the coarse moving, this coarse moving is switched to the fine moving before the target position, the slider block is moved up to the scale graduation position s of the position detector at the nearest position after exceeding the target position and the waveform of the voltage supplied to the piezoelectric element is changed in the voltage reducing direction to making access to the target position m from the inverse direction as shown in FIG. 14, magnitude of displacement generated on the piezoelectric element due to the hysteresis characteristic thereof is not determined and the slider block cannot be moved accurately to the target position.

Moreover, moving of the slider block for making access to the target position from the inverse direction after once exceeding the target position by changing the waveform of the voltage to be supplied to the piezoelectric element is not a desirable method because the control of the drive circuit is complicated and longer time is also required for the positioning.

In the positioning of the slider block described above, resolution of the scale of the position detector must be less than a half of the extending displacement of the piezoelectric element generated by one drive pulse.

Figure 15:
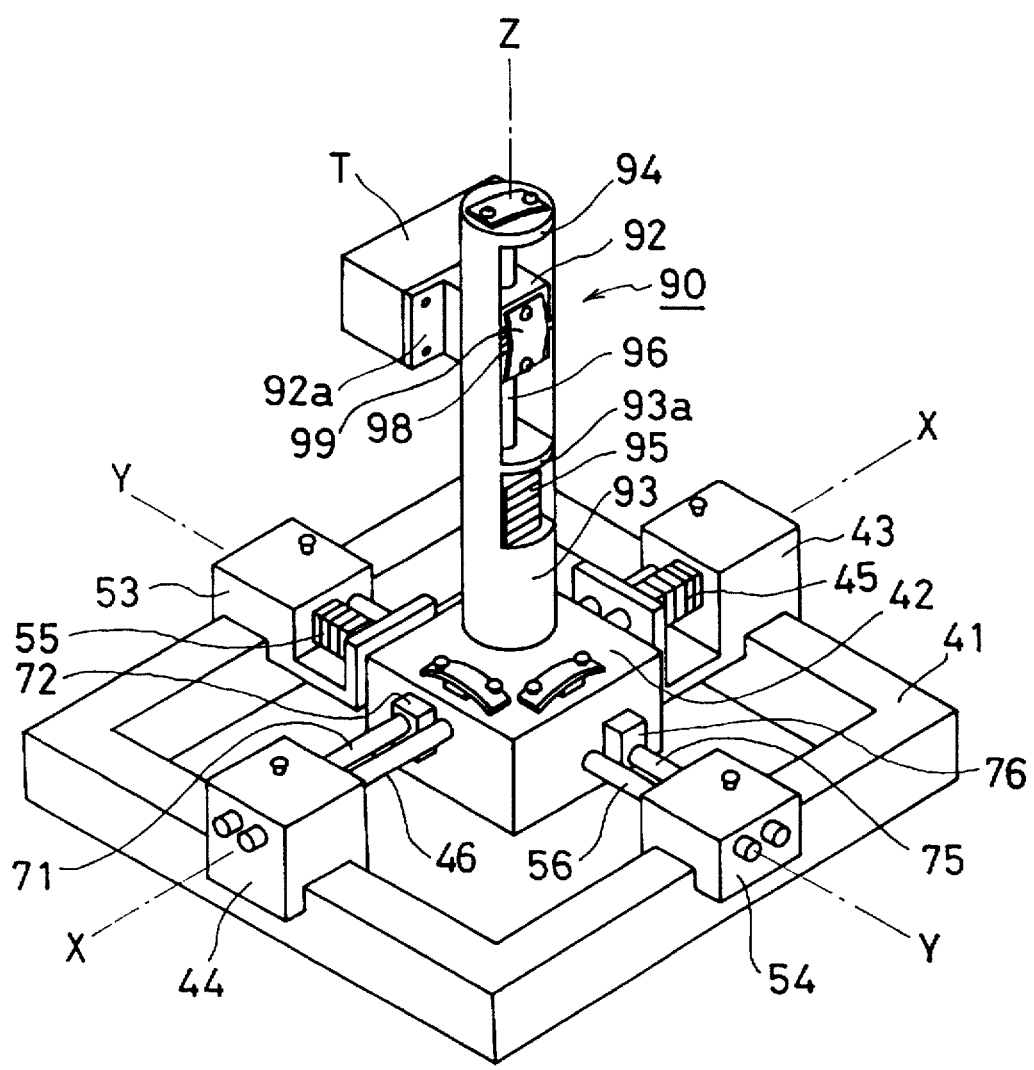
FIG. 15 is a perspective view illustrating the external view of the movable stage of the fourth embodiment which can move in the directions of three axes X, Y, Z.

FIG. 15 shows a movable stage which can be moved in the 3-axis direction of X, Y and Z axes of the fourth embodiment of the present invention. In this movable stage, the Z-axis direction actuator 90 is additionally provided on the slider block 42 of the X-Y axis movable stage of the third embodiment shown in FIG. 7 to FIG. 9.

Since the X-Y axis movable stage is identical to the X-Y axis movable stage of the third embodiment shown in FIG. 7 to FIG. 9, the same portions are designated by the same reference numerals and are not explained repeatedly. Therefore, only the constitution of the Z-axis direction actuator 90 will be explained briefly.

The Z-axis direction actuator 90 is constituted in the shape of a cylindrical unit, but the basic constitution thereof is similar to the actuator of the first embodiment shown in FIG. 1. An external cylinder 91 is constituted by mounting part 93, intermediate bearing 93a and end part bearing 94. The end part of the mounting part 93 is fixed, by the proper means such as bonding, to the slider block 42 of the X-Y axis movable stage.

A piezoelectric element 95 is provided between the mounting part 93 and intermediate bearing 93a and one end of the piezoelectric element 95 is bonded for the fixing purpose at the internal surface side of the mounting part 93. The drive shaft 96 is supported movable in the axial direction between the intermediate bearing 93a and the end part bearing 94. One end of the drive shaft 96 is bonded for the fixing purpose to the piezoelectric element 95 so that it is displaced in the axial direction (z-axis direction) due to the displacement in the thickness direction of the piezoelectric element 95.

The slider block 92 is provided with the drive shaft 96 extending therethrough and both slider block 92 and drive shaft 96 are pushed with the pad 98 energized with the plate spring 99 and are friction-coupled with each other with an adequate friction force. The slider block 92 is also provided with the mounting part 92a for the purpose of mounting the table T of the proper shape. Operation of the Z-axis direction actuator 90 is not different from the operations of the actuators 40 and 50 explained previously and therefore operation of the actuator 90 is omitted here. With the constitution explained above, the table T can move in the directions of the three axes X, Y and Z.

Figure 16:
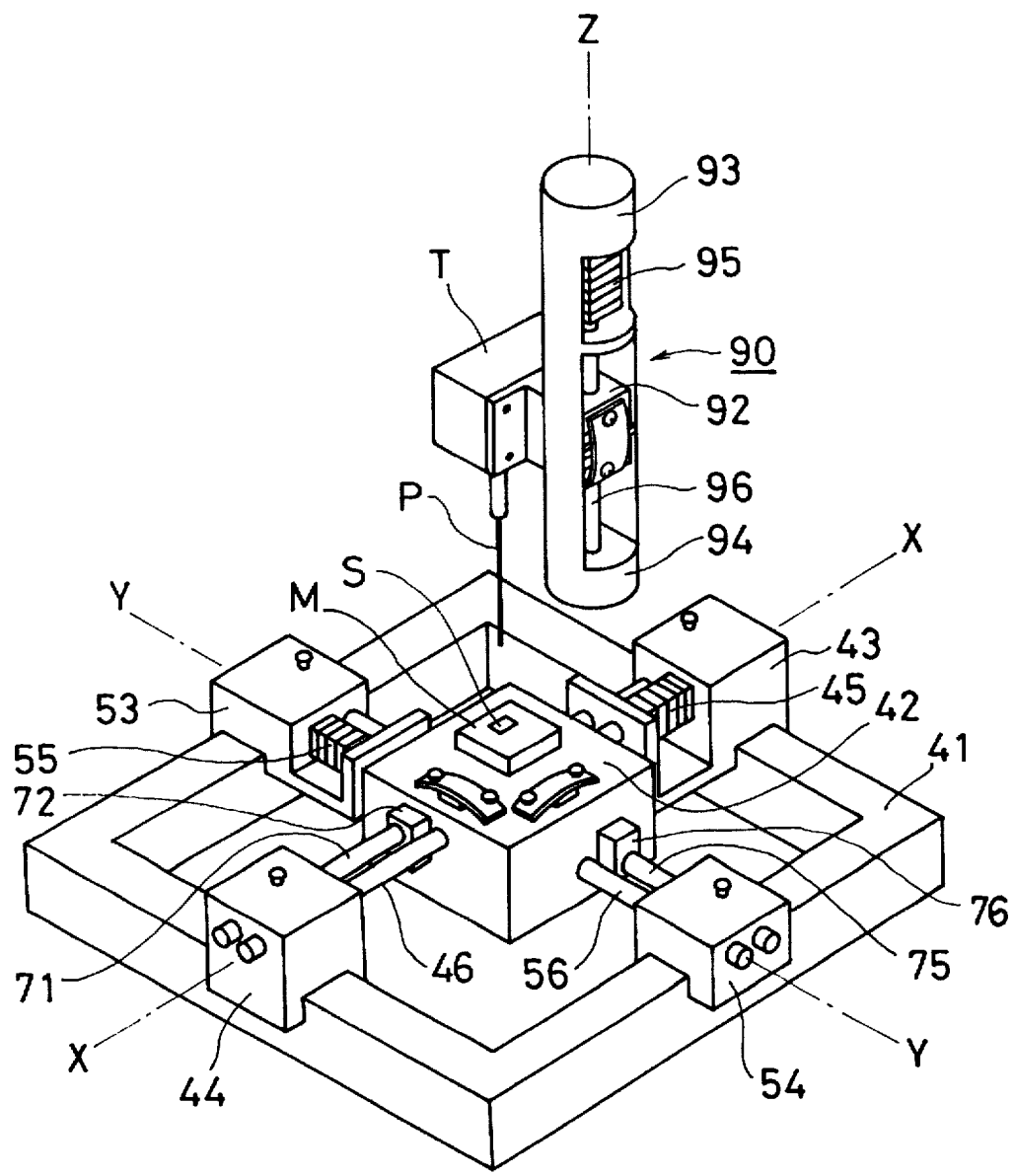
FIG. 16 is a perspective view illustrating a sample stage of a scanning type tunnel electron microscope of the fifth embodiment where an actuator for moving a probe in the Z-axis direction is provided on the X-Y axis movable stage.

FIG. 16 shows the movable stage as the fifth embodiment of the present invention wherein the X-Y axis movable stage is provided and moreover the Z-axis direction actuator is also provided at the upper part in separation from the X-Y axis movable stage. The external cylinder of the cylindrical Z-axis direction actuator 90 is fixed to the base of the X-Y axis movable stage with a proper means not illustrated.

Since the X-Y axis movable stage is identical to the X-Y axis movable stage of the third embodiment shown in FIG. 7 to FIG. 9, the identical portions are designated by the similar numerals and are not repeatedly described. Moreover, the Z-axis direction actuator is also provided upside down from the Z-axis direction actuator of the fourth embodiment shown in FIG. 15 but the constitution thereof is similar to the fourth embodiment. Therefore, the similar portions are designated by the like numerals and are not repeatedly explained.

FIG. 16 is the fifth embodiment of the present invention illustrating the X-Y axis movable stage used as an example of the sample stage of the scanning type tunnel electronic microscope to observe the shape of the surface of sample. That is, the table T mounted on the slider block 92 of the Z-axis direction actuator 90 is provided with a probe including the sharp end point and this probe is provided opposed to the sample S placed on the sample stage M arranged on the slider block 42 of the X-Y axis movable stage. The Z-axis direction actuator 90 is operated, allowing the probe P to come close to the sample and to be located to cause a tunnel current to flow into the probe P.

In order to cause the probe P to come close to the sample, the probe P is moved by the coarse moving operation up to the roughly selected position by supplying continuously the drive pulse to the piezoelectric element as explained previously in regard to the third embodiment and thereafter it is moved by the fine moving operation by supplying a gradually rising voltage to the piezoelectric element.

Next, when the Z-axis direction actuator 90 is operated while scanning the surface of the sample S in both X and Y directions by operating the slider block 42 of the X-Y axis movable stage in view of operating the Z-axis direction actuator 90 so that a current flowing into the probe P becomes constant, uneven condition of the surface of the sample can be observed from the application voltage of the piezoelectric element of the Z-axis direction actuator 90 because the application voltage of the piezoelectric element adjusted to make constant the current flowing into the probe P indicates an interval between the probe P and sample surface. The resolution of the height of the sample surface is 0.1 nm or less and when the end point of the probe is sufficiently sharpened, the atomic arrangement of the solid surface can also be observed.

Figure 17:
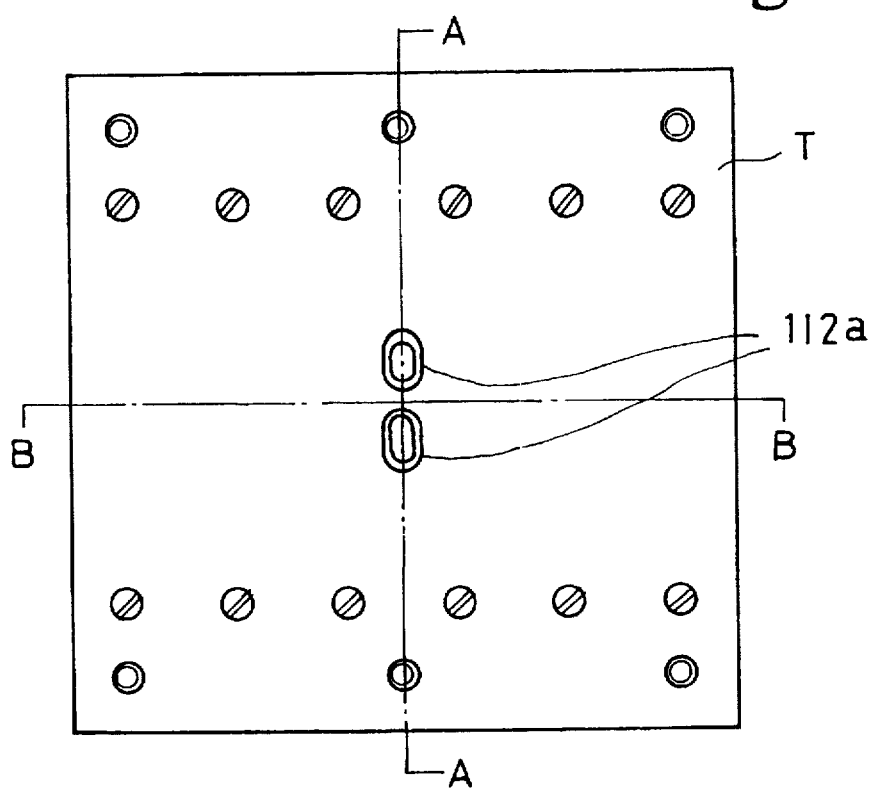
FIG. 17 is a plan view illustrating the external view of a movable stage of the sixth embodiment which can be moved in the X-axis direction.
Figure 18:
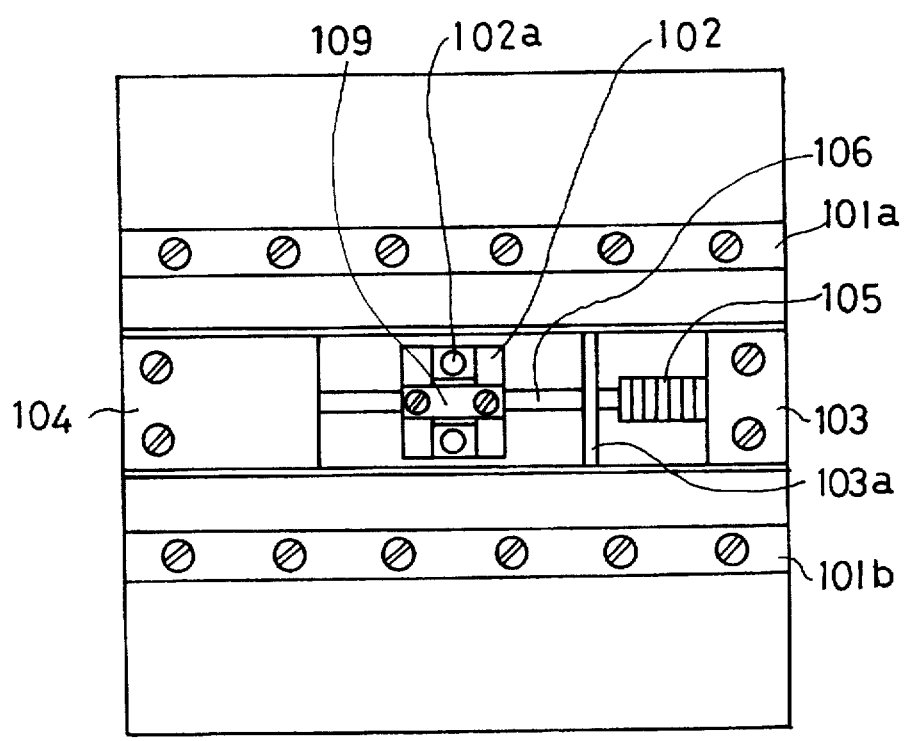
FIG. 18 is a plan view illustrating the condition that a table T is removed in the movable stage of the sixth embodiment shown in FIG. 17.
Figure 19:
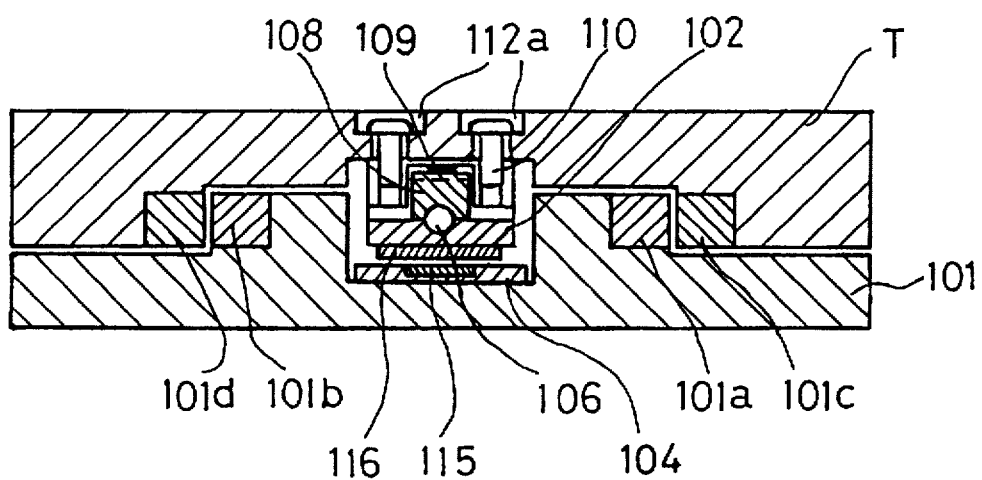
FIG. 19 is a sectional view of FIG. 17 along the line A—A.
Figure 20:
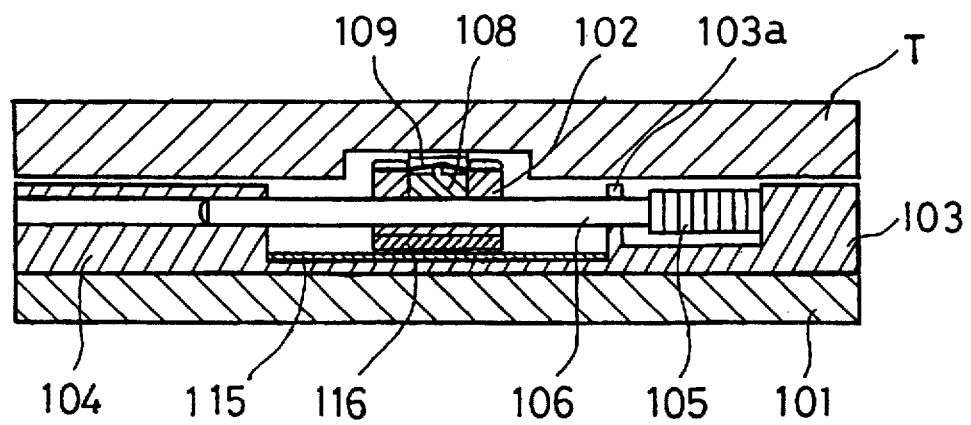
FIG. 20 is a sectional view of FIG. 17 along the line B—B.

FIG. 17 to FIG. 20 show the sixth embodiment of the present invention illustrating a movable stage which moves in one direction, namely in the direction of only X-axis. FIG. 17 is a plan view of the upper movable table T, while FIG. 18 is a plan view illustrating the condition where the table T is removed. FIG. 19 is a cross-sectional view of FIG. 17 along the line A—A, while FIG. 20 is a cross-sectional view of FIG. 17 along the line B—B.

A constitution will be explained with reference to FIG. 17 to FIG. 20. A base frame 101 is provided with the supporting blocks 103, 104, one end of the piezoelectric element 105 is stationarily bonded to the supporting block 103, while the other end of the piezoelectric element 105 is stationarily bonded with the drive shaft 106. The drive shaft 106 is supported movable in the axial direction between the supporting blocks 103a and 104. Moreover, the drive shaft 106 is friction-coupled with the slider block 102. A constitution of the friction coupling portion is similar to the constitution shown in FIG. 2, wherein the lower half of the drive shaft 106 is provided in contact with the slider block 102 and the pad 108 energized by the plate spring 109 pressurizes the upper half of the drive shaft 106.

Numeral 115 designates a magnetization rod, while 116, a magneto-resistance element to form a position detector. The constitution and function thereof are similar to that of the third embodiment and are not repeatedly explained. Numeral 110 designates a screw for fixing the table T on the slider block 102.

The base frame 101 is provided with guides 101a, 101b for guiding the table T in parallel to the drive shaft 106. Moreover, the table T is provided with the guides 101c, 101d to be slidably in contact with the guides 101a, 101b of the base frame 101 and the guides 101a, 101b of the base frame 101 are set in contact with the guides 101c, 101d of the table T without any looseness and the table T slides with respect to the base frame 101 to linearly move. The guide for guiding linear movement between the base frame 101 and table T is not limited only to the constitution shown in the figure and allows variety of constitutions used existingly.

The slider block 102 is provided with screw holes 102a for fixing the table T. Meanwhile, the table T is provided with holes 112a extended in the direction orthogonally crossing the moving direction at the position corresponding to the screw holes 102a and thereby when the slider block 102 and the table T are fixed with screws 110, the table T can be moved for adjustment in the direction orthogonally crossing the moving direction thereof.

Thereby, even when a slight deviation occurs in the parallelism between the moving direction of the table T guided by the guides 101a, 101b and guides 101c, 101d and the moving direction of the table T driven by the drive shaft 106, since the table T can move in the direction orthogonal to the moving direction with the hole extended in the direction orthogonally crossing the moving direction of the table T, the table guided by the guides 101a, 101b and guides 101c, 101d can move smoothly without any interference.

Operation for moving the table T by applying a drive pulse to the piezoelectric element is similar to that of the embodiment already explained and therefore it is not repeatedly explained here.

In the embodiments explained above, the piezoelectric element and drive shaft are provided in the side of the base frame, namely in the side of the supporting block and the table is fixed to the moving member, namely to the slider block. However, it is of course possible to provide the piezoelectric element and drive shaft in the side of the table and to fix the moving member, namely the slider block to the side of the base frame. Even with the latter constitution, the table can be moved relative to the base frame.

In the first to the fifth embodiments explained above, since the slider block and table T are integrally fixed, when an impact is applied on the table T, it is probable that the actuator including the piezoelectric element breaks down. Moreover, in the sixth embodiment, since the the guides 101c, 101d of the table T is caused to be slidably in contact with the guides 101a, 101b provided in the side of the base frame and these guises are fixed with screws, impact to be applied to the table T is received once by the guide, never breaking down the actuator. However, a degree of freedom for coupling between the slider block and table T is rather small. This drawback is improved in the seventh and eighth embodiments which will be explained hereunder.

Figure 21:
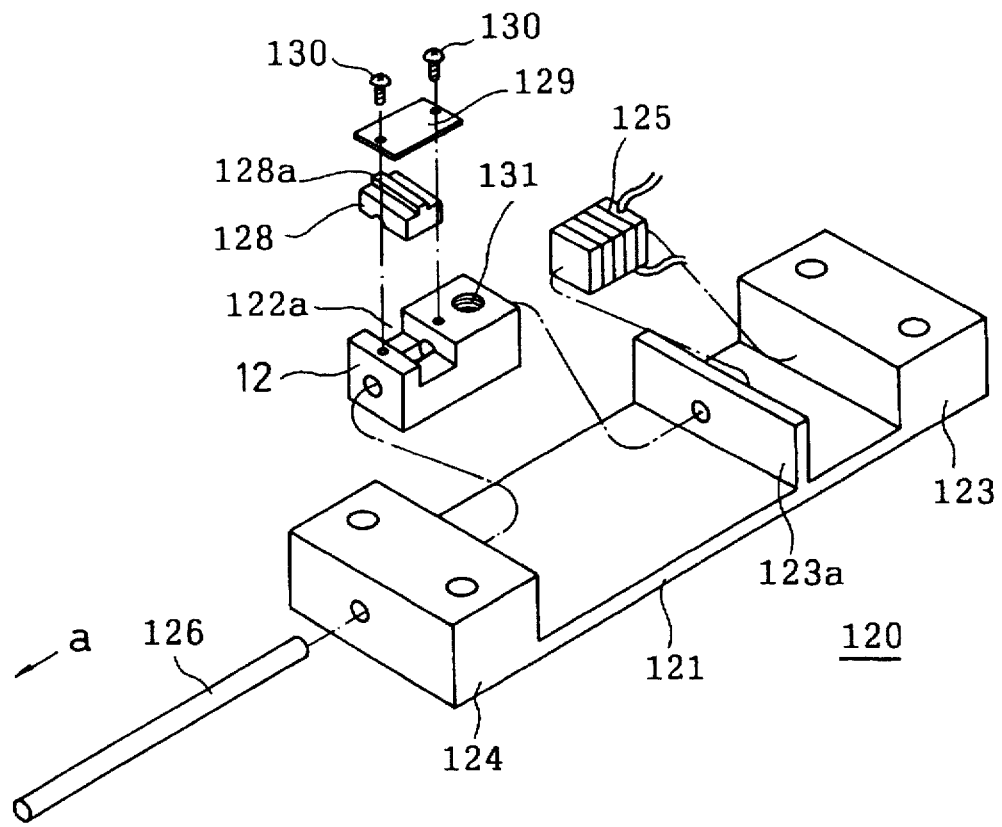
FIG. 21 is a perspective view of the disassembled constitution of an actuator to be used in the seventh embodiment of the present invention.
Figure 22:
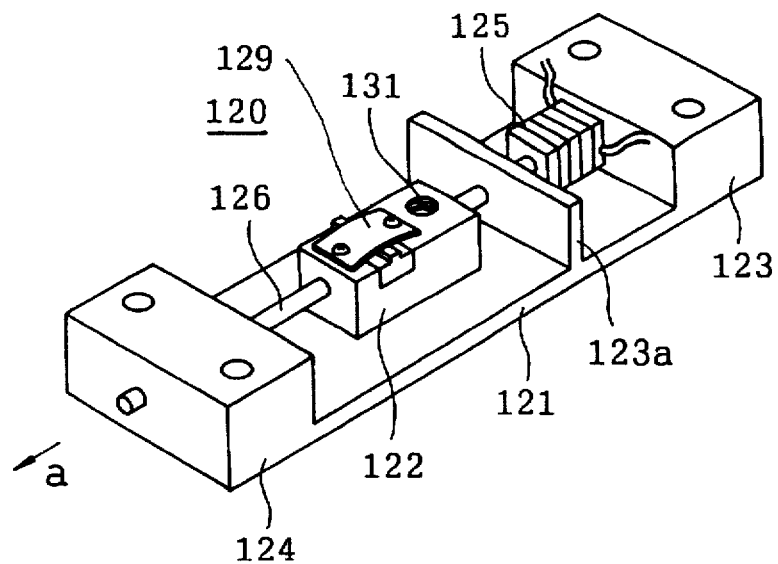
FIG. 22 is a perspective view illustrating assembled condition of the actuator shown in FIG. 21.

FIG. 21 is a perspective view illustrating disassembled constitutional members of the actuator suitable for use in the movable stage as the seventh embodiment of the present invention. FIG. 22 is a perspective view illustrating the assembled condition of the actuator.

In FIG. 21 and FIG. 22, the actuator 120 is composed of frame 121, supporting blocks 123, 124, drive shaft 126, piezoelectric element 125 and slider block 122. The drive shaft 126 is supported movable in the axial direction by the supporting blocks 123a and 124. One end of the piezoelectric element 125 is stationarily fixed to the supporting block 123, while the other end thereof is stationarily fixed to one end of the drive shaft 126. The drive shaft 126 is supported displaceable in the axial direction (direction of the arrow a and direction opposed thereto) when the piezoelectric element 125 generates displacement in the thickness direction.

The slider block 122 allows the drive shaft 126 to be provided therethrough in the lateral direction, an aperture 122a is formed at the upper part of the drive shaft 125 provided therethrough and the upper half of the drive shaft 126 is exposed. Moreover, the pad 128 placed in contact with the upper half of the drive shaft 126 is inserted into the aperture 122a, the pad 128 is provided with a projection 128a at its upper part, the projection 128a of the pad is pushed down by the plate spring 129 and the pad is given the downward energizing force F so that it is placed in contact with the drive shaft 126.

Moreover, numeral 131 designates a threaded hole for implanting a coupling pin 148 (refer to FIG. 23) for coupling the slider block 122 and table described later; 130, a screw for fixing the plate spring 129 to the slider block 122. Driving operations of the actuator 120 are similar to that of the actuator explained in regard to the first embodiment and explanation thereof is omitted here.

Figure 23:
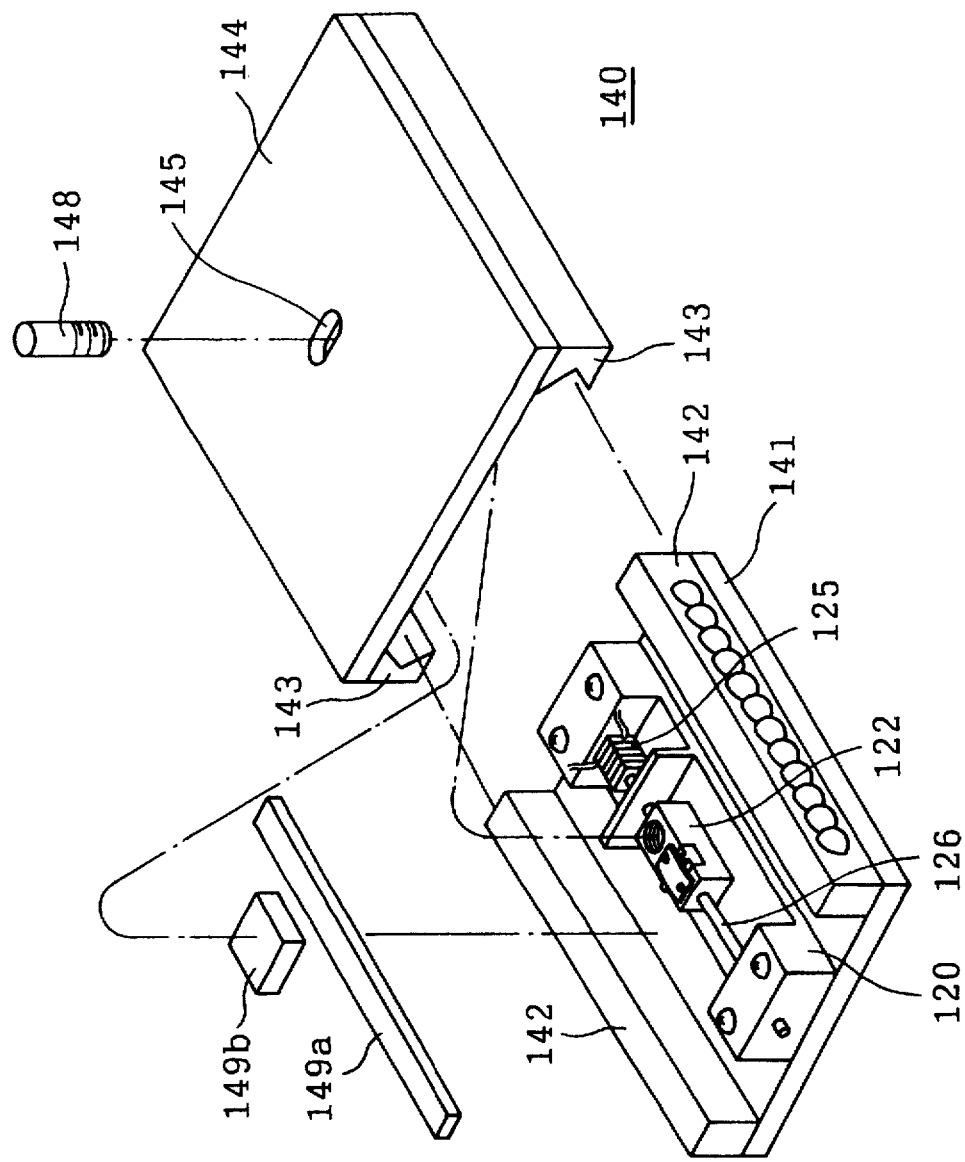
FIG. 23 is a active view illustrating disassembled constitution of the movable stage of the seventh embodiment.

FIG. 23 is a perspective view illustrating disassembled X-axis movable stage 140 constituted by using the actuator shown in FIG. 21 and FIG. 7 22. In FIG. 23, numeral 141 designates base frame; 142, linear ball bearing provided at the side edge of the base frame 141; 144, table for placing an object provided with a slide 143 to be engaged with the linear ball bearing at its lower surface. Moreover, on the base frame, the actuator 120 explained previously is stationarily fixed at the center thereof.

Two linear ball bearings 142 provided at the side edge of the base frame 141 are well known, arranged in parallel with each other and engaged with two slides 143 arranged in parallel at the rear side edge of the table 144 to support movable in parallel the table 144 with respect to the base frame 141.

The table 144 allows formation of the hole 145, at its center, to be engaged with the coupling pin 148 implanted on the slider block 122 of the actuator. The hole 145 is narrowly formed in the direction parallel to the moving direction of the table 144, engaged with the coupling pin 148 without any looseness in the direction parallel to the moving direction of the table 144, engaged loosely with the coupling pin 148 in the direction orthogonal to the moving direction in view of providing no interference on movement of the table even if there is a certain error in the operating direction of the actuator 120 and in the moving direction of the table 144 supported by the linear ball bearing 142.

In order to detect the position of the table 144, the movable stage 30 is also provided with a position detector (MR sensor) consisting of the magnetization rod 149a magnetized as N and S poles in the predetermined interval and magneto-resistance 149b. The constitution and function thereof are similar to that of the third embodiment and therefore these are not repeatedly explained here.

Figure 24:
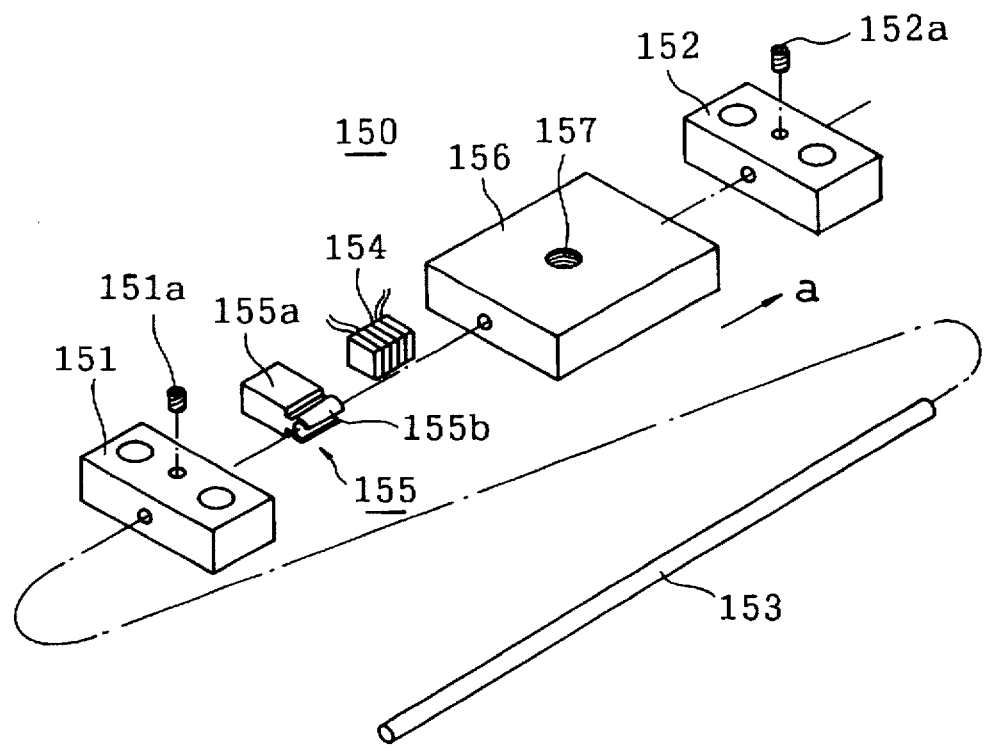
FIG. 24 is a perspective view illustrating disassembled constitution of the actuator to be used in the eighth embodiment of the present invention.
Figure 25:
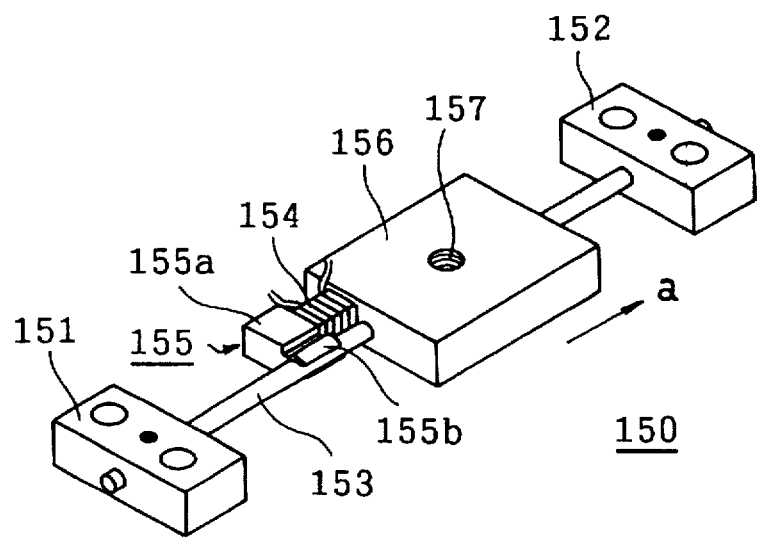
FIG. 25 is a perspective view illustrating assembled condition of the actuator shown in FIG. 24.

Next, the eighth embodiment of the present invention will be explained. FIG. 24 is a perspective view illustrating the disassembled constitutional members of the actuator suitable for the movable stage of the eighth embodiment of the present invention. FIG. 25 is a perspective view illustrating the assembled constitution of the actuator. This actuator is of the type where the piezoelectric element and slider block move along the guide shaft.

In FIG. 24 and FIG. 25, the actuator 150 is composed of the supporting blocks 151, 152, guide shaft 153, piezoelectric element 154, working member 155 and slider block 156.

The guide shaft 153 is stationarily fixed with screws 151a, 152a to the supporting blocks 151, 152 which are fixed to the base frame of the movable stage not illustrated with screws or the like. The piezoelectric element 154 is stationarily bonded at one surface to the working member 155, while also stationarily bonded at the other surface to the slider block 156. The slider block 156 is supported so that it is guided by the guide shaft 153 to move in the direction of the guide shaft. Numeral 157 designates a threaded hole for implanting a coupling pin for coupling the slider block 156 with the table explained later.

The working member 155 is composed of a block 155a which is stationarily fixed to the piezoelectric element 154 and a holding portion 155b for holding the guide shaft 153 with a predetermined pressure and the holding portion 155b is friction-coupled with the guide shaft 155.

With the constitution explained above, when a sawtooth drive pulse including the gradual waveform and the quick falling waveform is applied to the piezoelectric element 54 as in the case of the first embodiment, the gradual rising waveform of the drive pulse causes the piezoelectric element 154 to gradually displace in the thickness direction. In this timing, since the holding portion 155b of the working member 155 is friction-coupled with the guide shaft 153, the working member 155 does not move relative to the guide shaft 153 and the slider block 156 is guided by the guide shaft 153 to move in the direction of arrow a.

The quick rising waveform, meanwhile, of the drive pulse causes the piezoelectric element 154 to quickly displace in the thickness direction. In this case, since the inertia force of the working member 155 overcomes the friction-coupling force between the guide shaft 153 and holding portion 155b, the working member 155 moves in the direction of arrow a relative to the guide shaft 153, with a certain slip, but the slider block 156 does not move.

Continuous application of the drive pulse to the piezoelectric element 154 causes the slider block 156 to continuously move in the direction of arrow a. The slider block can be moved in the opposite direction (direction opposed to the arrow a) by, as in the case of the first embodiment, changing the waveform of the sawtooth drive pulse to be applied to the piezoelectric element 54 including the quick rising waveform and gradual falling waveform.

Figure 26:
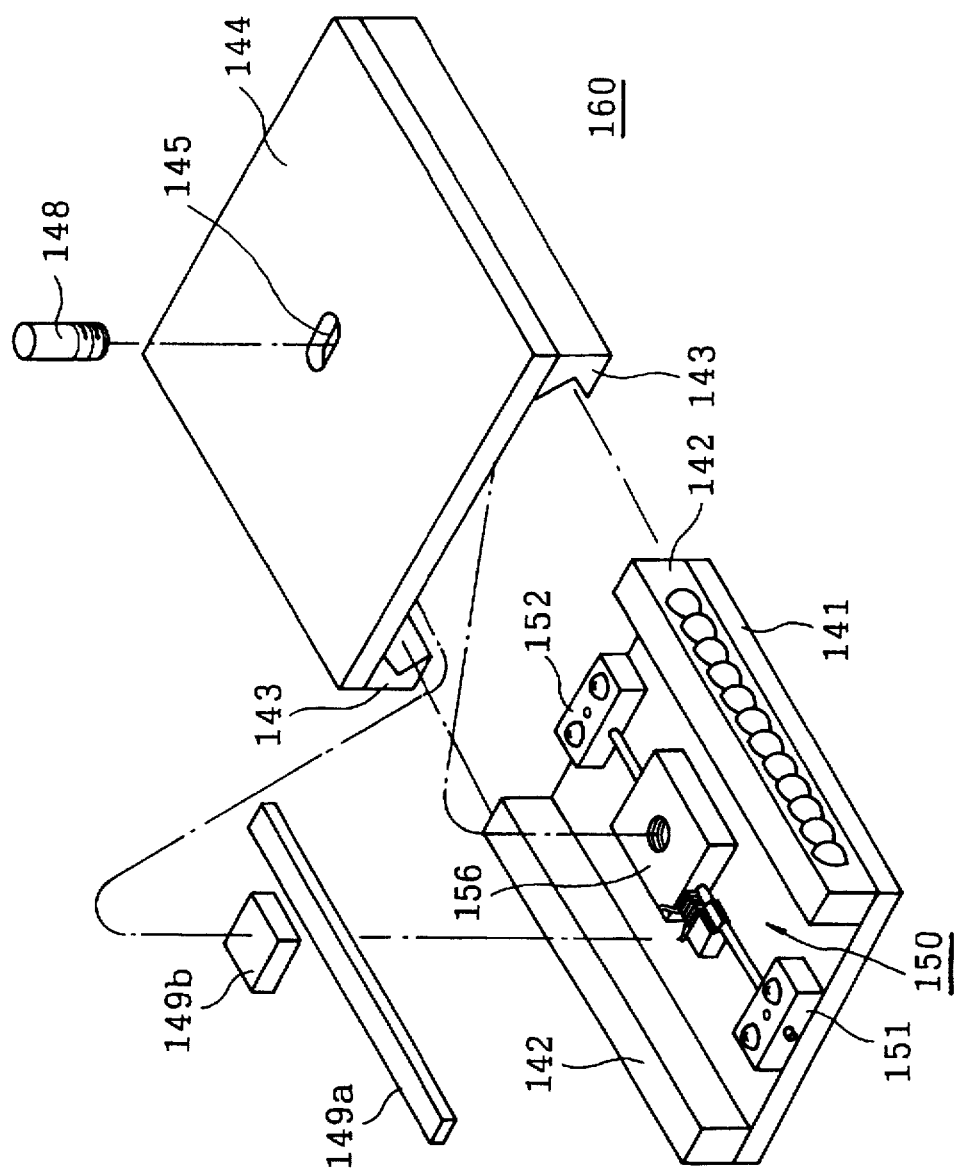
FIG. 26 is a perspective view illustrating disassembled constitution of the movable stage of the eighth embodiment

FIG. 26 is a perspective view illustrating the disassembled movable stage 160 constituted by utilizing the actuator 150 shown in FIGS. 24 and 25, wherein the actuator 120 is replaced with the actuator 150 in the movable stage 140 of the seventh embodiment already explained. The portions common to the movable stage of the seventh embodiment are designated by the like reference numerals and are not repeatedly explained.

Next, a constitution of the coupling portion for coupling the table and slider block will be explained with inclusion of various modifications. Any one of these modifications is designed so that the weight of the object placed on the table is not applied directly to the actuator and some modifications may eliminate any trouble due to deviation of the table and slider block derived from an assembling error.

Figure 27:
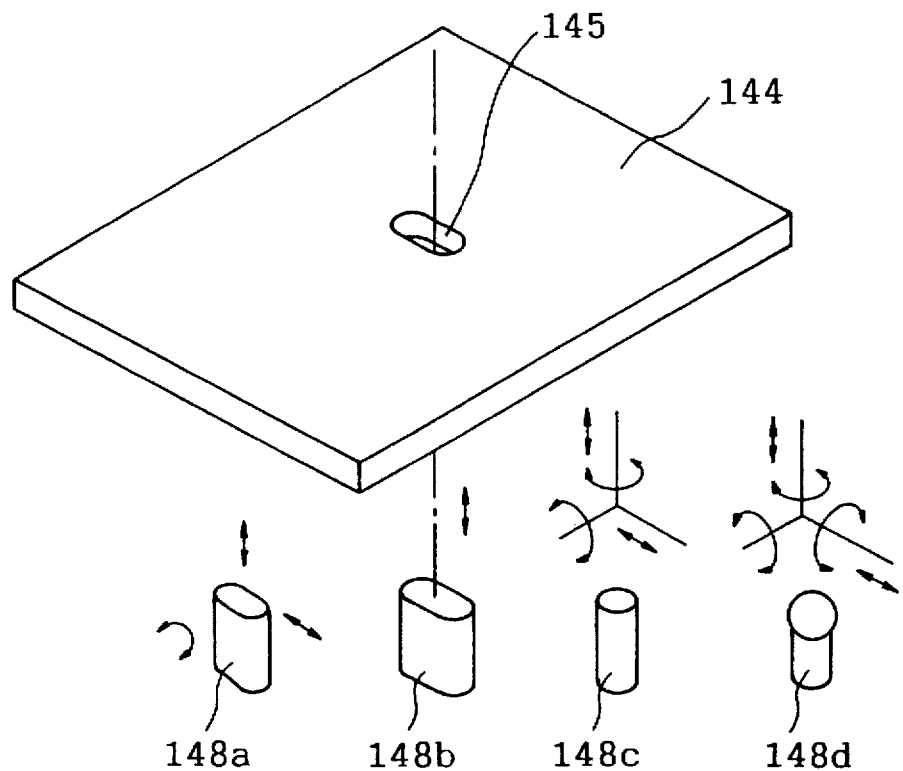
FIG. 27 is a perspective view illustrating modification examples of the coupling portion between the table and slider block.

FIG. 27 shows a modification example of the shape of the coupling pin 148 provided through the hole 145 (refer to FIG. 23) on the table for coupling the table and slider block. This modification example will be explained considering an example thereof applied to the seventh embodiment, but it can naturally be applied also to the other example.

Since the coupling pin 148a has a cross-sectional shape similar to the shape of the hole 145 and can be engaged with the hole 145 resulting in a certain looseness, it allows vertical deviation of the slider block for the table, deviation in the direction orthogonal to the moving direction and a certain inclination not to hinder the movement of the table. Moreover, since the coupling pin 148b has a cross-sectional shape matched with the shape of the hole 145 and can be engaged with the hole 145 not resulting in any looseness, it allows deviation in the vertical direction of the slider block to the table but it does not allow deviation in other directions.

Since the coupling pin 148c is formed circular as the cross-sectional shape and is coupled with a short diameter of the hole 145 without any looseness, it allows vertical deviation of the slider block for the table, deviation in the direction orthogonal to the moving direction, inclination of pin around the shaft and right and left inclination for the moving direction. Moreover, since the coupling pin 148d has a spherical part for engagement with the hole 145 and is engaged with the short diameter of the hole 145 without any looseness, it allows deviation in the vertical direction of the slider block for the table, deviation in the direction orthogonal to the moving direction, inclination (rotation) of pin around the shaft and right and left inclination in the moving direction.

Figure 28:
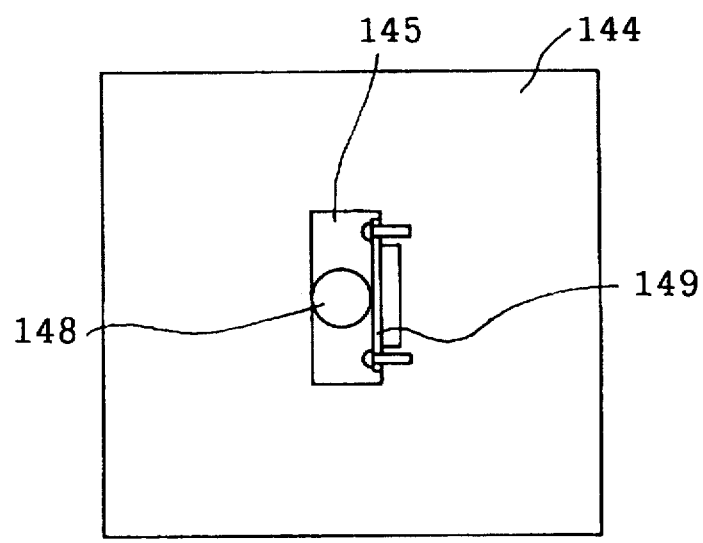
FIG. 28 is a perspective view illustrating another modification example of the coupling portion between the table and slider block.

FIG. 28 shows a modification example of the coupling portion wherein the coupling pin 148 provided through the hole 145 on the table for coupling the table and slider block is energized in one direction with a spring member 149 to eliminate looseness between the coupling pin 148 and hole 145.

Figure 29:
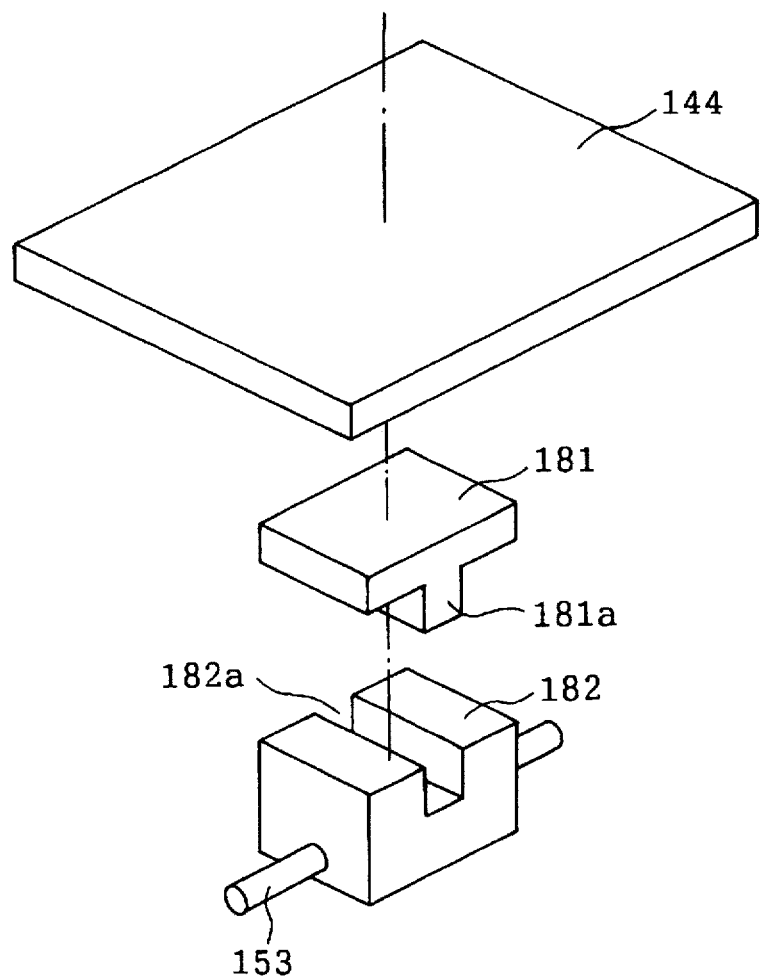
FIG. 29 is a perspective view illustrating another modification example of the coupling portion between the table and slider block.
Figure 30:
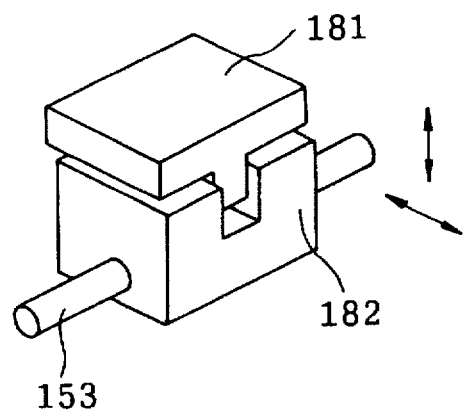
FIG. 30 is a perspective view illustrating the assembled condition of the coupling portion shown in FIG. 29.

FIG. 29 and FIG. 30 are diagrams illustrating modification examples of the couplings between the table and slider block through a sliding block, which are modification examples of the eighth embodiment (refer to FIG. 26) and can also be applied to the other embodiments. The slider block 156 of the eighth embodiment is replaced with a block 182 provided with the groove 182a which is slidable in the direction orthogonal to the table moving direction and the table 144 is fixed to the slidable block 181 by engaging, with the rear surface of the table 144, the slidable block 181 having the projected line 181a to be engaged with the groove 182a. This constitution allows vertical deviation of the slider block 182 relative to the table 144, deviation in the direction orthogonal to the moving direction and zigzag movement.

Figure 31:
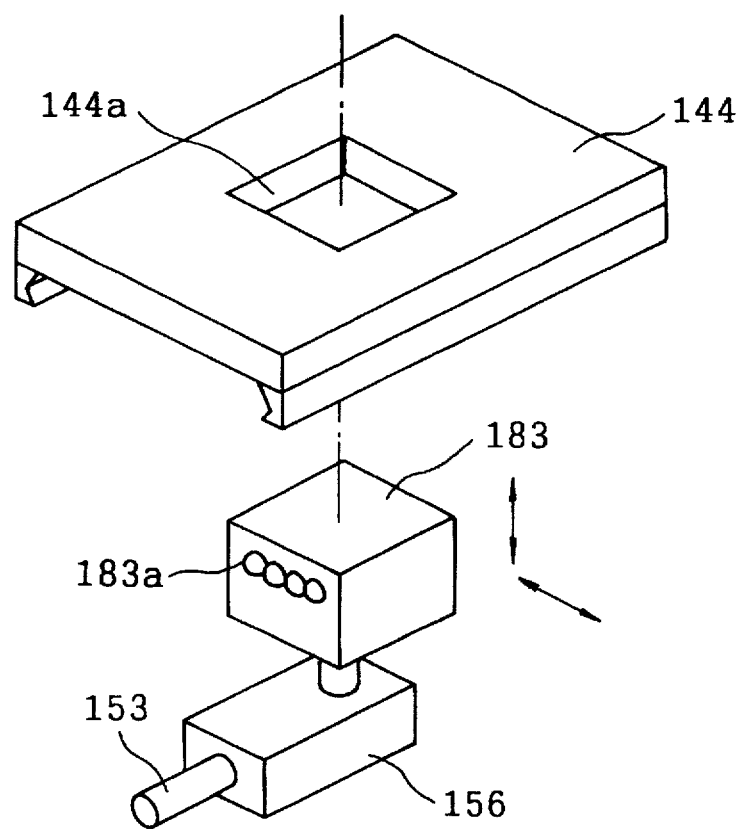
FIG. 31 is a perspective view illustrating another modification example of the coupling portion between the table and slider block.

FIG. 31 is a diagram illustrating also a modification example of the coupling between the table and the slider block through a sliding block, which is also a modification example of the eighth embodiment (refer to FIG. 26) and can also be applied to the other embodiments. The sliding block 183, which is provided with the linear ball bearing 183a in the direction orthogonal to the table moving direction, is mounted on the slider block 156 of the eighth embodiment and the table 144 is provided with the hole 144a to which the sliding block 183 is loosely coupled in the direction orthogonal to the table moving direction. This constitution allows, as in the case of the constitution shown in FIG. 29, the vertical deviation of the slider block 156 relative to the table 144, deviation in the direction orthogonal to the table moving direction and zigzag movement.

Figure 32:
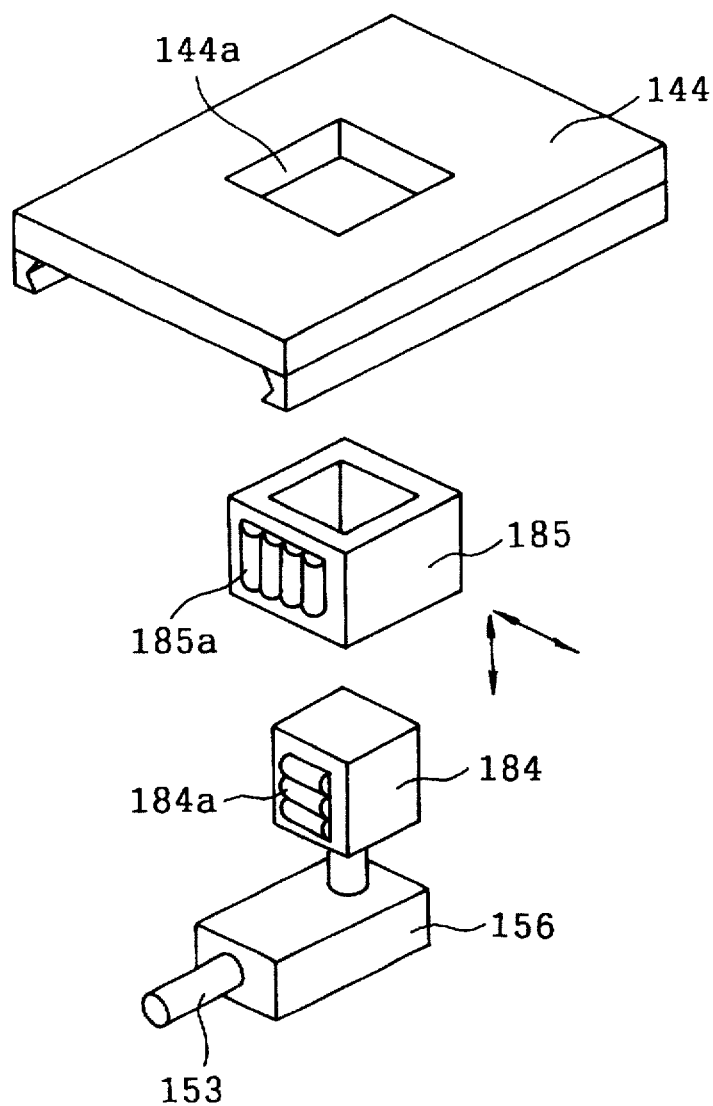
FIG. 32 is a perspective view illustrating another modification example of the coupling portion between the table and slider block.

FIG. 32 is a diagram also illustrating a modification example of the coupling between the table and the slider block through a sliding block, which is also a modification example of the eighth embodiment (refer to FIG. 26) and can also be applied to the other embodiments. The first sliding block 184, which is provided with a linear roller bearing 184a in the vertical direction to the table, is mounted on the slider block 156 of the eighth embodiment, the second sliding block 185, which is provided with the linear roller bearing 185a in the direction orthogonal to the table moving direction, is provided engaging at the outside of the first sliding block engaging therewith, and the table 144 is provided with a hole 144a through which the second sliding block 185 is loosely coupled in the direction orthogonal to the table moving direction. This constitution also allows, as in the case of the constitutions shown in FIG. 29 and FIG. 31, vertical deviation of the slider block 156 relative to the table 144, deviation in the direction orthogonal to the table moving direction and zigzag movement.

Next, the ninth and tenth embodiments of the present invention will be explained. These ninth and tenth embodiments relates to a movable stage utilizing a humidity-proof actuator for use under the high humidity condition or in the water.

Figure 33:
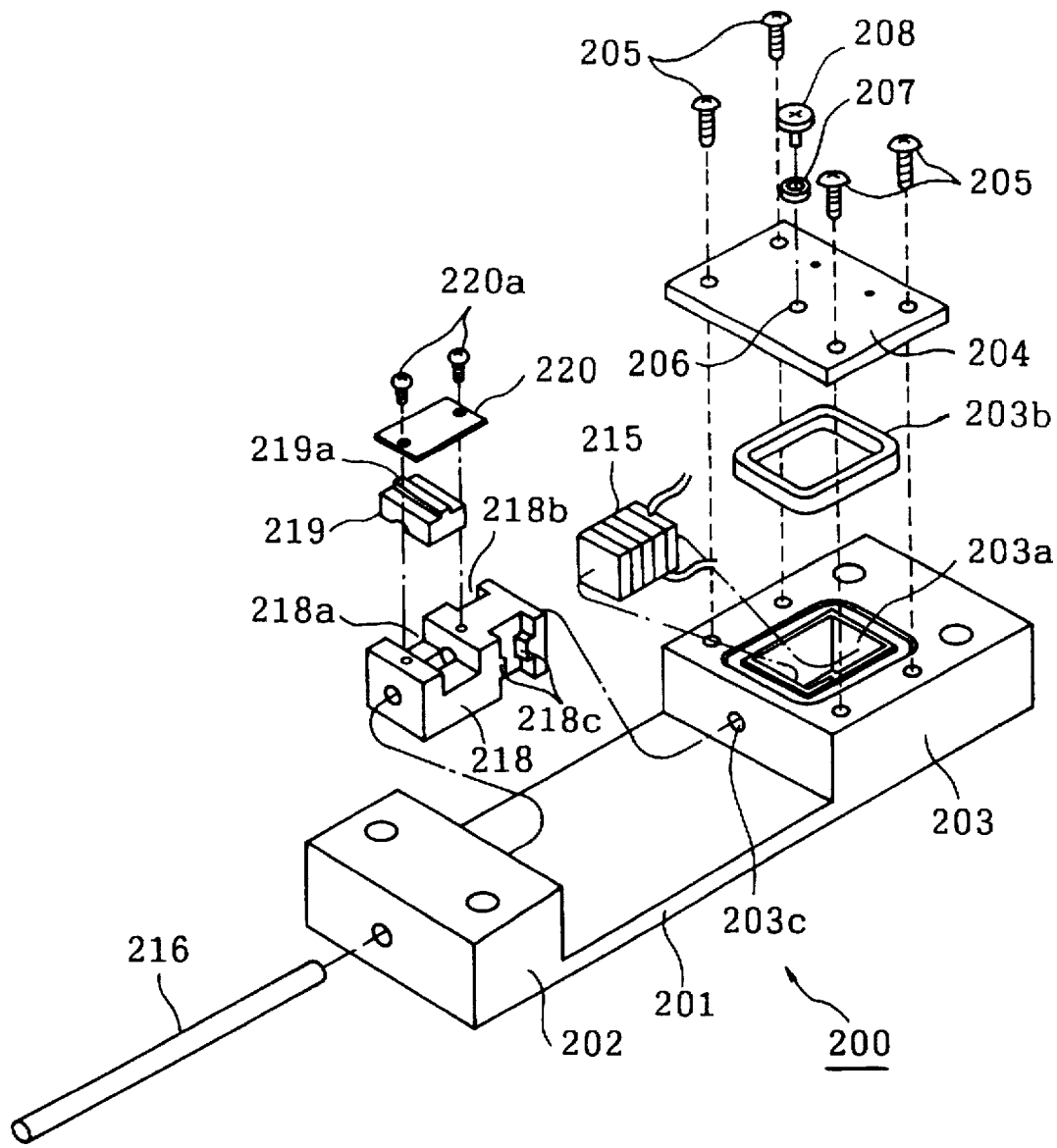
FIG. 33 is a perspective view of disassembled constitution of the humidity proof type actuator to be used in the ninth embodiment of the present invention.
Figure 34:
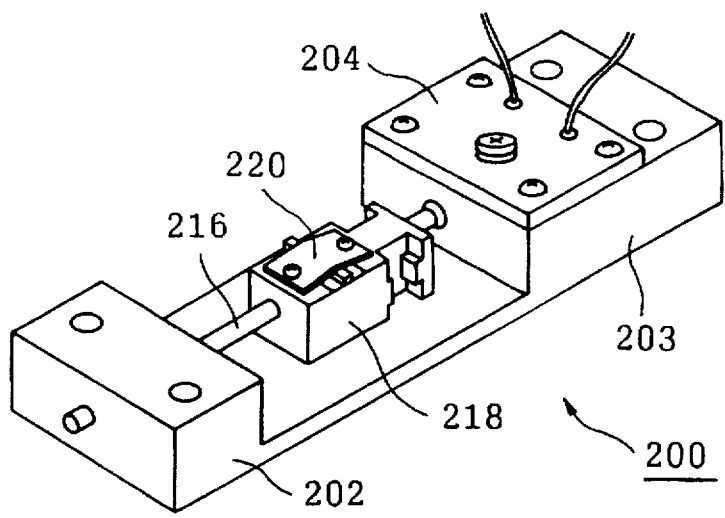
FIG. 34 is a perspective view illustrating the assembled condition of the actuator shown in FIG. 33.
Figure 35:
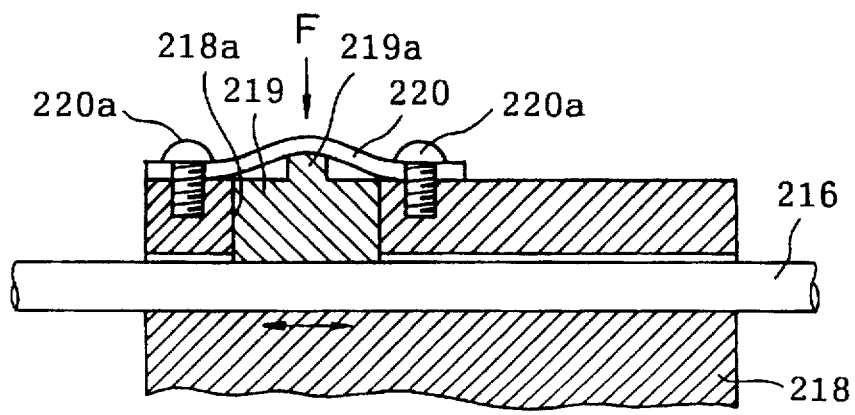
FIG. 35 is an enlarged cross-sectional view of the friction coupling portion of the actuator shown in FIG. 33.

FIG. 33 shows a perspective view illustrating disassembled constitutional members of a humidity-proof actuator. FIG. 34 is a perspective view illustrating the assembled constitution of the actuator. FIG. 35 shows a cross-sectional diagram illustrating a constitution of the friction-coupling portion among the drive shaft, slider block and pad.

In FIG. 33 to FIG. 35, the actuator 200 accommodates base frame 201, supporting block 202, piezoelectric element 215 and is composed of piezoelectric element chamber 203 also working as the supporting block to support the drive shaft 216, drive shaft 216, slider block 218 and others. Periphery of the aperture 203a of the piezoelectric element chamber 203 is occupied with packing 203b and when the cover 204 closing the piezoelectric element chamber 203 is fixed to the piezoelectric element chamber 203 with a screw 205, the aperture 203a of the piezoelectric element chamber 203 is hermetically sealed.

The piezoelectric element chamber 203 accommodates the piezoelectric element 215 and one end of the piezoelectric element 215 is stationarily bonded to the side wall of the piezoelectric element chamber 203. Moreover, the piezoelectric element chamber 203 is provided with a hole 203c through which the drive shaft 216 is provided and one end of the drive shaft 216 provided through the inside of the hole 203c is stationarily fixed at one end of the piezoelectric element 215.

The drive shaft 216 is supported movable in the axial direction by the supporting block 202 and piezoelectric element chamber 203 also working as the supporting block so that it can displace in the axial direction (direction of arrow a and direction opposed thereto) when the piezoelectric element 215 shows displacement in the thickness direction.

Between the hole 203c and drive shaft 216, a packing member such as O-ring is engaged to assure the air-tightness of the piezoelectric element chamber 202. The threaded hole 206 provided on the cover 204 works as an inlet port for introducing dry air or the gas such as nitrogen gas into the piezoelectric element chamber 203 and this hole 206 is sealed by fixing the packing member 207 with a screw 208 after the gas is introduced.

The slider block 218 allows the drive shaft 216 to be provided therethrough in the horizontal direction and an aperture 218a is formed at the upper part where the drive shaft 216 is provided to exposed the upper half of the drive shaft 216. Moreover, a pad 219 which is to be in contact with upper half of the drive shaft 216 is inserted into the aperture 218a, the pad 219 is provided with a projection 219a at the upper part thereof, the projection 219a of the pad 219 is pushed downward by the plate spring 220 and thereby the pad 219a is given the downward energizing force F enough to be in contact with the drive shaft 216. The screw 220a fixes the plate spring 220 to the slider block 218 and the energizing force F can be adjusted by adjusting the tightening of the screw 220a. With this constitution, the slider block 218 including the pad 219 and the drive shaft 216 are pressurized in contact with the energizing force F and are friction-coupled with an adequate friction force.

Figure 36:
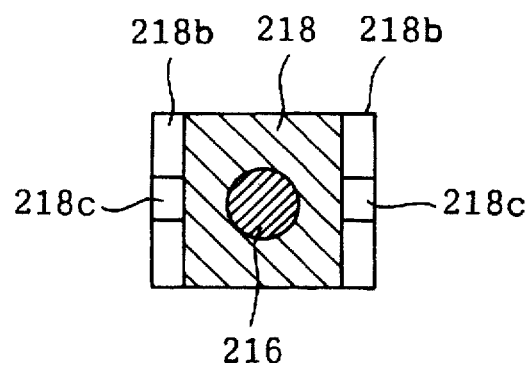
FIG. 36 is a cross-sectional view of the area near the groove of slider block of the actuator shown in FIG. 33.

In the slider block 218, a groove portion 218b, to which the coupling member 305 (refer to FIG. 37) for coupling the table 304 and slider block 218 to be described later is inserted, is formed point-symmetrically to the drive shaft 216 and the groove portion 218b further allows formation of a projected portion 218c. FIG. 36 is a cross-sectional view of the slider block 218 cut along the plane perpendicular to the drive shaft 216, illustrating the condition that the groove portion 218b and the projected portion 218c are formed symmetrically for right and left direction relative to the drive shaft 216. The reason for right and left symmetrical condition of the groove portion relative to the drive shaft will be explained later.

Drive operation of the actuator is similar to that of the first embodiment and it is therefore not repeatedly explained here.

Figure 37:
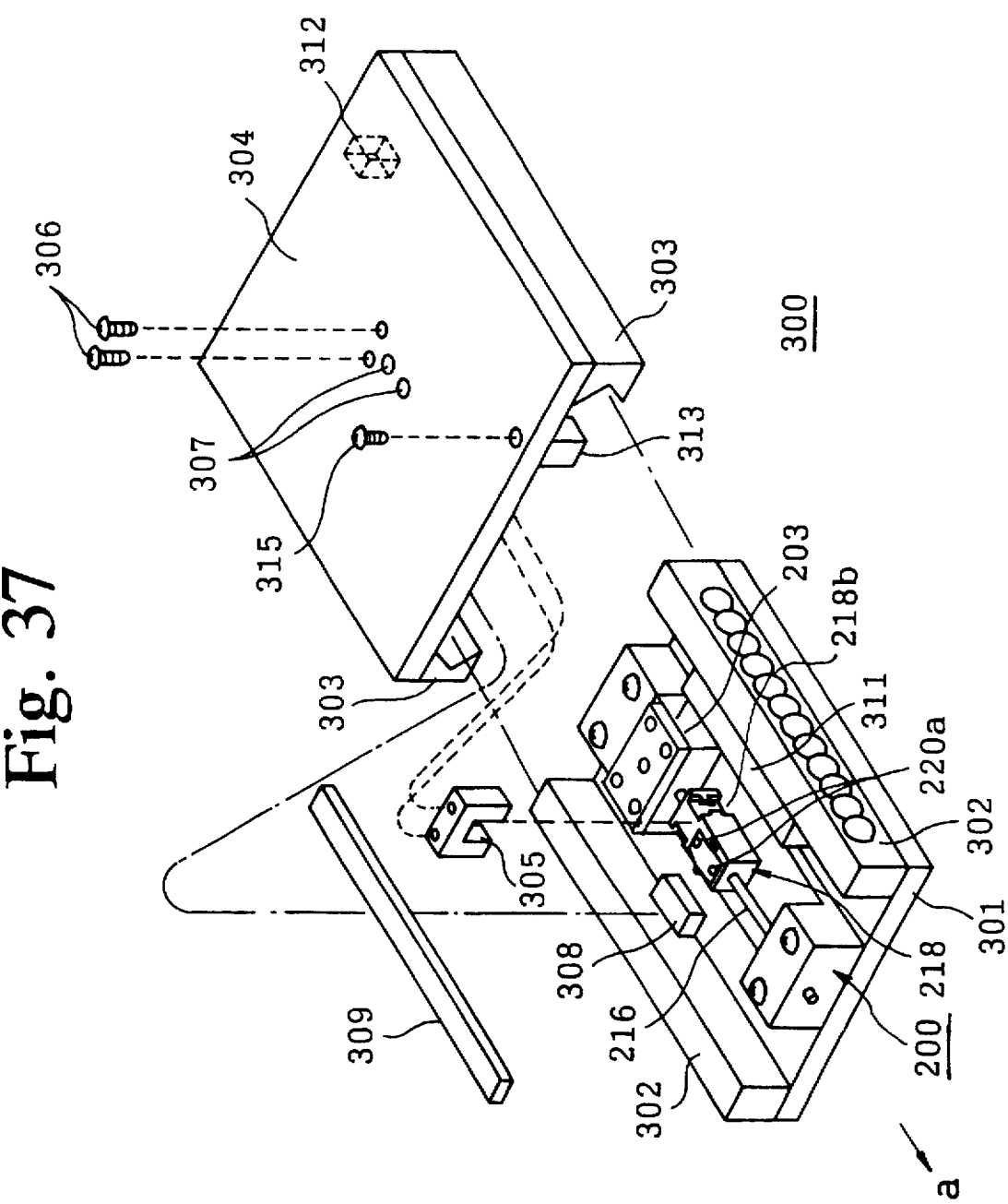
FIG. 37 is a perspective view illustrating the disassembled constitution of the X-axis movable stage of the ninth embodiment utilizing the humidity proof type actuator.

FIG. 37 is a perspective view illustrating the disassembled condition of the humidity-proof X-axis movable stage 300 constituted using the actuator explained above as the the ninth embodiment of the present invention. In FIG. 37, numeral 301 designates a base frame; 302, a linear ball bearing provided at the side edge of the base frame 301; 304, a table for placing an object thereon to allow, at the rear surface thereof, provision of a sliding portion 303 to be engaged with the linear ball bearing 302. Moreover, on the base frame 301, the actuator 200 explained previously is stationarily fixed at the central area thereof.

Two linear ball bearings 302 provided at the side edge of the base frame 301 is well known element. These are arranged in parallel for engagement with the two sliding portions 303 arranged in parallel at the rear side edge of the table 304 to support the table 304 movable in parallel relative to the base frame 301.

On rear side of the table 304, the coupling member 305 to be inserted into the groove portion 218b of the slider block 218 of the actuator 200 is fixed with the screw 306 at the central area of the table. With this constitution explained above, the table 304 and slider block 218 of the actuator 200 integrally move in the moving direction of the slider block 218, allowing fluctuation of interval between the slider block 218 and table 304 and zigzag movement of the table 304 relative to the slider block 218. In addition, the assembling work can be facilitated by forming the table 304 and coupling member 305 with different members and fixing them with the screw.

Moreover, the table 304 is provided with an adjusting hole 307 for adjusting tightening of the screw 220a for fixing the plate spring 220 to the slider block 218. When the table 304 moves so that the hole 307 is located just above the screw 220a, the screw 220a can be rotated using a screwdriver inserted into the hole 307 to adjust a friction force between the slider block 218 including the pad 219 and the drive shaft 216. Here, it is also possible that the slider block 218 is provided upside down to provide an adjusting hole for adjusting tightening of the screw 220a to the base frame 301.

In order to detect the position of the table 304, a position detector (MR sensor) utilizing the magnetization rod 309 and magneto-resistance element 308 is provided to the movable stage 300 as in the case of the embodiments explained previously.

In view of regulating the moving range of the table 304 to the base frame 301, a regulation block 311 is fixed on the base frame 301 and the regulating blocks 312, 313 are fixed to the rear side of table 304 with the fixing means such as the screw 315. When the table 304 moves up to the limit position in the direction of arrow a relative to the base frame 301, the regulating block 312 in the rear side of table 304 is in contact with the regulating block 311 of the base frame 301 to restrict movement of the table. Moreover, when the table 304 moves up to the limit position in the direction opposed to the direction of arrow a relative to the base frame 301, the regulating block 313 in the rear side of table 304 is in contact with the regulating block 311 of the base frame 301 to restrict movement of the table. Moreover, the contact position is set so that when the slider block 218 moves, the regulating block 312 or 313 is placed in contact with the regulating block 311 immediately before the slider block 218 is placed in contact with the supporting block 202 or supporting block 203. Thereby, since the slider block 218 is never placed in contact with the supporting block 202 or 203 even if the table 304 is manually moved, it will never occur that the piezoelectric element, slider and drive shaft are broken down or the coupling portion between the piezoelectric element and supporting block or the coupling portion between the piezoelectric element and drive shaft is broken down.

Further, in addition to the means utilizing the regulating block explained above, it is also possible to engage a rubber ring around the drive shaft in the side of the slider block 218 of the supporting block 203 of the actuator and in the side of the slider block 218 of the supporting block 202. According to this constitution, even if the slider block collides with the supporting block, its impact can be alleviated and impact sound level can also be reduced.

Figure 38:
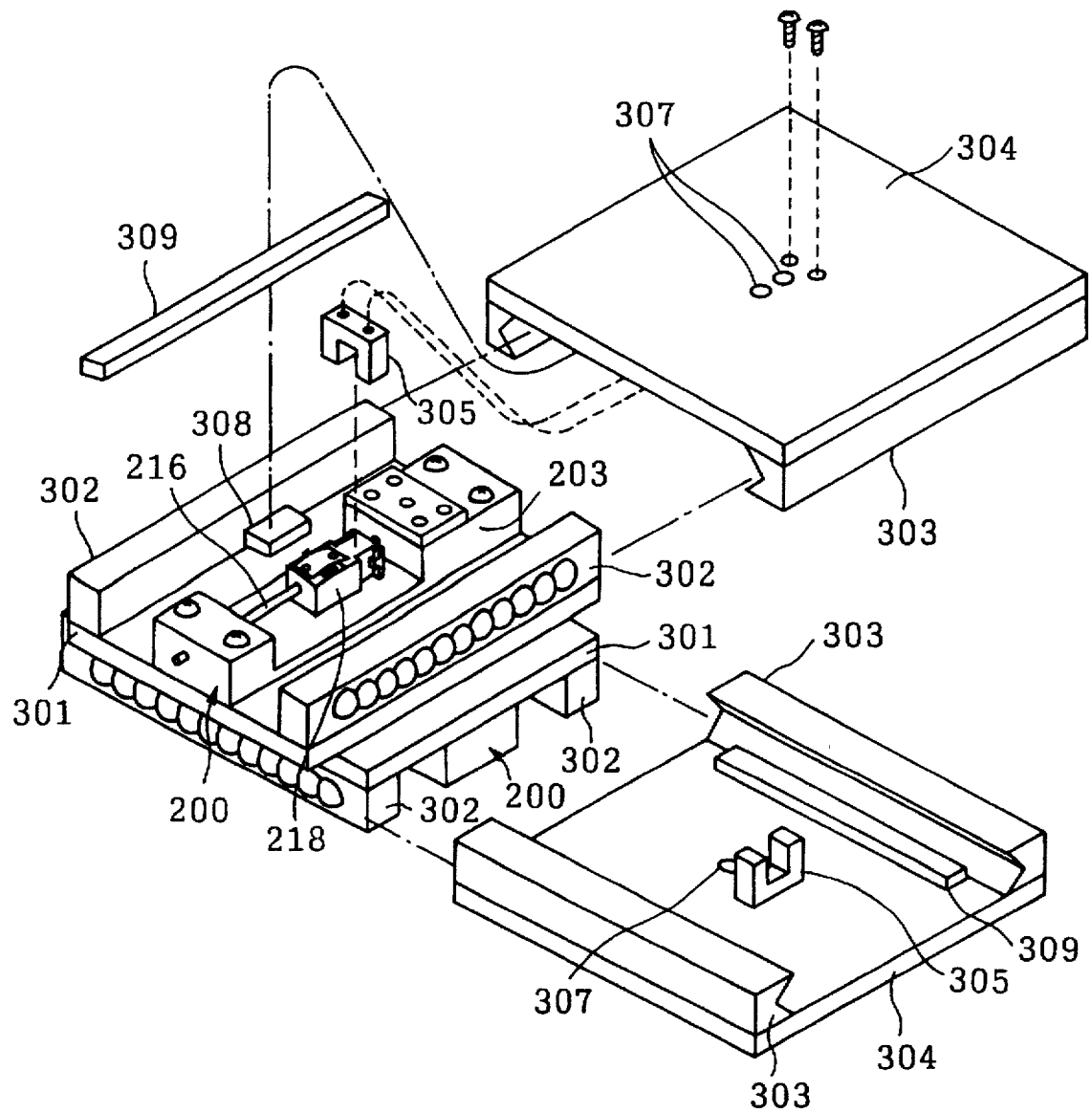
FIG. 38 is a perspective view illustrating the disassembled constitution of the X-Y axis movable stage of the tenth embodiment utilizing the humidity proof type actuator.

FIG. 38 is a perspective view illustrating the disassembled condition of the humidity-proof X-Y axis movable stage which can be moved in both X-axis and Y-axis directions utilizing the actuator explained above as the tenth embodiment of the present invention.

This 2-axis movable stage prepares a couple of humidity-proof X-axis movable stages explained in regard to FIG. 37, in which the first X-axis movable stage is provided upside down so that the base frame is located at the upper side and the second X-axis movable stage is stationarily provided, on the base frame, with deviation of 90 degrees from the first X-axis movable stage. The respective X-axis movable stages are similar to the X-axis movable stage explained in regard to FIG. 37. Therefore, the like elements are given the like reference numeral and these are not repeatedly explained here.

With the constitution explained above, the humidity-proof X-Y axis movable stage can be formed easily and moreover since the adjusting hole 307 provided at the table 304 for adjusting tightening of the screw 220a to fix the plate spring 220 to the slider block 218 is located at both upper and rear sides of the X-Y axis movable stage, an energizing force F of the plate spring 220, that is, a friction force between the slider block 218 including the pad 219 and the drive shaft 216 can be adjusted easily.

Figure 39:
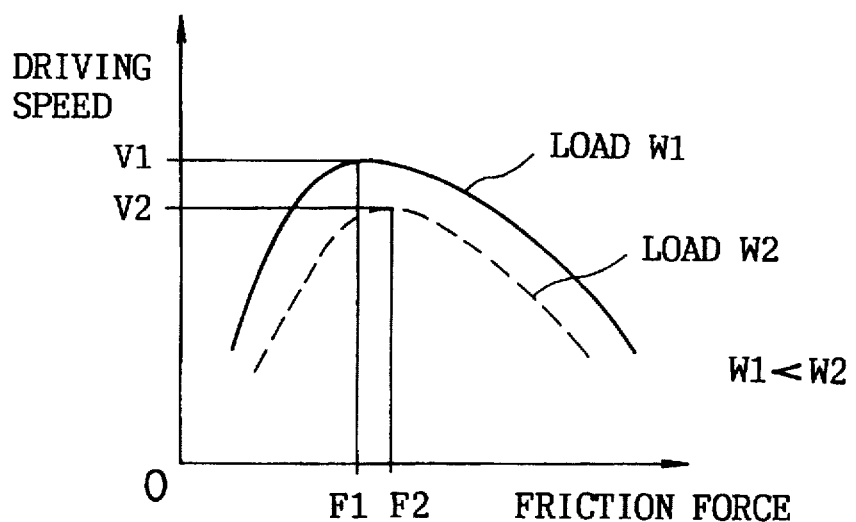
FIG. 39 is a diagram showing relationship among load, friction force and driving velocity of the actuator.

FIG. 39 shows relationship among a load, a friction force and a drive speed of the actuator used for driving the movable stage of the present invention, teaching that when a load is constant (W1), a driving speed shows the maximum value V1 at a certain friction force F1 and when the friction force is larger or small than such value F1, the drive speed is lowered. Moreover, it is also suggested that when a load increases, the drive speed is lowered. That is, when the load changes to a larger value W2 from the value W1, the drive speed is lowered to the smaller value V2 from the value V1.

Next, the reason why the groove portion for inserting the coupling member to couple the table and slider block is formed point-symmetrically for the drive shaft relative to the drive shaft of the actuator will be explained hereunder.

Figure 40:
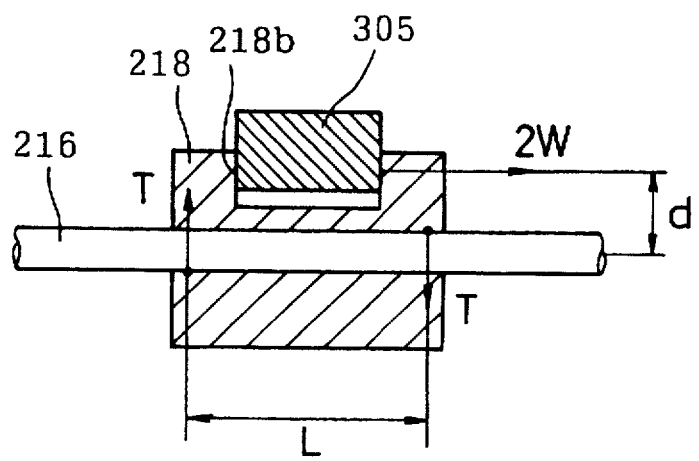
FIG. 40 is a diagram for explaining load working on a coupling member for coupling the table and slider block in one side and a reaction force generated in the slider block

First, it will be explained that the groove portion allowing insertion of the coupling member is not point-symmetrically formed for the drive shaft. FIG. 40 is a plan view of the slider block of the actuator, where the groove portion 218b of the slider block 218 is provided only at one side (upper side of FIG. 40) and the groove portion 218b of the slider block 218 is formed non-symmetrically for the drive shaft 216.

In this case, since the coupling member 305 is inserted into the groove portion 218b at the upper side of the slider block 218, a rotating moment 2W·d is generated on the slider block 218 when a load working on the slider block 218 from the table is assumed as 2W and the distance between the center line of the drive shaft 216 and the working point of the load applied on the slider block 218 as d. However, since the slider block 218 and drive shaft 216 are engaged without any looseness, a reaction force T=Wd/L is generated on the drive shaft 216. Here, L is an distance between the working points of the rotating moment working on the slider block 218.

A friction force F generated between the drive shaft and slider block by the reaction force T is expressed by the following equation:

$$F = 2\mu T = 2\mu W d/L$$

Here, $\mu$ is a coefficient of friction force. This friction force is different from a friction force generated by an energizing force of the plate spring 220 and it gives a large effect on the drive characteristic because it is added to the friction force generated by the plate spring 220. However, when distance d is sufficiently smaller than distance L, a value of the reaction force T is as small as can be neglected, not giving a large effectiveness on the drive characteristic.

Figure 41:
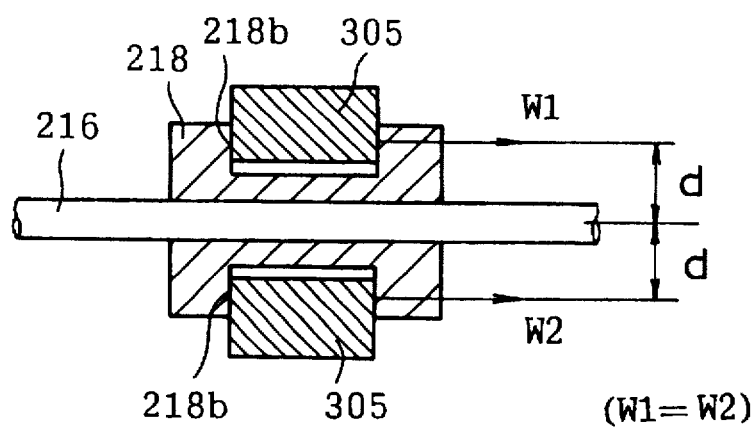
FIG. 41 is a diagram for explaining load working on a coupling member for coupling the table and slider block in both side and a reaction force generated in the slider block.

Next, point-symmetrical formation relative to the drive shaft of the groove portion for engagement with the coupling member will then be explained hereunder. FIG. 41 is a plan view of the slider block of the actuator. The groove portion 218b of the slider block 218 is point-symmetrically formed relative to the drive shaft 216 (in both upper and lower sides in FIG. 41).

In this case, since the coupling member 305 is engaged with a couple of groove portions 218b of the slider block 218, the loads W1, W2 (W1=W2) working on the slider block 218 from the table is applied equally on the point-symmetrical bases (both upper and lower sides in FIG. 41) to the center line of the drive shaft 216 and the rotating moment W1·d by the load W1 and the rotating moment W2·d by the load W2 are cancelled with each other because the rotating directions of them are opposed with each other, not generating any rotating moment.

Therefore, as in the case where the groove portions of the slider block are formed asymmetrically, a new friction force is never generated between the drive shaft and slider block due to the load working on the slider block from the table and the drive characteristic is determined only with a friction force generated by the plate spring 220.

As explained above, according to the present invention, since the movable stage is constituted using an actuator introducing an electromechanical transducer as a drive mechanism without use of feed screw mechanism and reduction gear mechanism, cause of error generation such as back-lash occurring in these mechanisms can be eliminated and the table can be moved in higher accuracy. Moreover, since coarse moving and fine moving in unit of nanometer (nm) can be realized with only one drive source, a high precision movable stage can be constituted without complication of the constitution.

Moreover, since the movable stage of the present invention which has utilized the electromechanical transducer has point-symmetrically engaged the moving member friction-coupled with the drive member and the movable table, relative to the drive member, any rotating moment is not generated on the moving member even with a load working on the movable table and a new friction force is never generated between the drive member and the movable member friction-coupled with such drive member.

Thereby, there is provided a drive mechanism utilizing the electromechanical transducer element which assures stabilized friction force without generating a new friction force based on the load between the drive member and the movable member friction-coupled with such drive member and has the stabilized drive characteristic.

Moreover, when the table for placing an object is supported movable independent of the drive mechanism in the movable stage of the present invention, if an impact is applied to the table, it is not applied in direct to the drive mechanism, enabling probability for breaking down the drive mechanism.

In addition, since the table for placing an object is movable supported independent of the drive mechanism, it can always be driven because a friction coefficient of the friction-coupling portion of the drive mechanism never changes depending on weight of the object to be placed on the table. Moreover, since engagement between the table and drive mechanism is given a certain degree of freedom, there is no change of friction force due to drawback of the engaging portion derived from the assembling error and stable drive can be assured, thus providing a small size and high precision movable stage.

Furthermore, the movable stage utilizing the electromechanical transducer element of the present invention arranges an electromechanical transducer element within a hermetically sealed space to provide a drive mechanism using the electromechanical transducer which can be used under the high humidity environment or in the water without receiving any influence of humidity when introducing a dry gas, for example, the nitrogen gas as required into the hermetically sealed space and can easily be treated without requiring any particular care and treatment for adhesion of water element even under the ordinary application condition.

In addition, the movable stage utilizing the electromechanical transducer element of the present invention provides a small size movable stage for high precision movement and stoppage which can manually move the movable table because the drive member and movable member are only friction-coupled, can eliminate, on the occasion of providing a limiting means for limiting the movable range of the movable table for the base frame to the predetermined range, collision of the movable means with the supporting block on the base frame even when an excessive force is applied during manual movement of the movable table, can eliminate breakdown of the drive member, movable member, electromechanical transducer element, coupling portion between the electromechanical transducer element and supporting block on the base frame and coupling portion between the electromechanical transducer element and drive member.

The movable stage utilizing an electromechanical transducer element of the present invention can expand application range of the movable stage and maintain more stable drive characteristic for a long period of time because a friction force adding means is provided to give a friction force for the adjustment to the contact surface between the drive member and movable member to easily adjust the friction force to be given. Moreover, since the maximum driving force can be controlled easily by adjusting a magnitude of the friction force, the predetermined drive force can be assured and safe operation of the apparatus used can be protected by setting the maximum drive force to the safe drive force or less of variety of apparatuses in which the movable stage is used.

It is further understood by those skilled in the art that the foregoing description is a preferred embodiment of the disclosed device and that various changes and modifications may be made in the invention without departing from the spirit and scope thereof.

What is claimed is:

1. A movable stage utilizing an electromechanical transducer, comprising:
    a base frame having a guiding portion extended in a predetermined direction;
    a movable table that is guided to be movable in the predetermined direction by said guiding portion;
    an electromechanical transducer one end of which is fixed at said base frame to produce linear mechanical expansion and contraction in said predetermined direction in response to an input electrical signal;
    a drive member coupled at the other end of said electromechanical transducer and is supported, by said base frame, to be linearly movable in the predetermined direction with said mechanical expansion and contraction;
    a movable member friction-coupled with said drive member and also coupled with said movable table to freely move in said predetermined direction; and
    a drive controller for driving said electromechanical transducer to move said movable table in the predetermined direction.

2. A movable stage utilizing an electromechanical transducer claimed in claim 1, further comprising an electrical signal supplying circuit for supplying electrical signals to drive said electromechanical transducer, and wherein said drive controller controls said electromechanical transducer by controlling an electrical signal supplied from said electrical signal supplying circuit.

3. A movable stage utilizing an electromechanical transducer claimed in claim 1, wherein said drive controller controls drive of said electromechanical transducer so that it provides different rates of expanding and compressing displacement depending on the moving direction of said movable table.

4. A movable stage utilizing an electromechanical transducer claimed in claim 1, further comprising a position detector for detecting position of said movable table relative to the base frame, whereby said drive controller controls drive of said electromechanical transducer depending on detection result of said position detector.

5. A movable stage utilizing an electromechanical transducer claimed in claim 1, wherein a drive mechanism consisting of said electromechanical transducer and said drive member is provided in each of two directions crossing with each other to move said movable table in two directions.

6. A movable stage utilizing an electromechanical transducer claimed in claim 1, wherein a drive mechanism consisting of said electromechanical transducer and said drive member is provided in each of three directions crossing with each other to move said movable table in three directions.

7. A movable stage utilizing an electromechanical transducer claimed in claim 1, wherein a coupling portion between said movable member and movable table is formed symmetrical to the axial line in the driving direction of said drive member.

8. A movable stage utilizing an electromechanical transducer claimed in claim 1, wherein said electromechanical transducer is provided within a hermetically sealed space.

9. A movable stage utilizing an electromechanical transducer claimed in claim 8, wherein said hermetically sealed space in which electromechanical transducer is provided is filled with a dry gas.

10. A movable stage utilizing an electromechanical transducer claimed in claim 1, further comprising a regulating member for regulating the movable range of said movable table relative to said base frame.

11. A movable stage utilizing an electromechanical transducer claimed in claim 1, wherein a friction-coupled portion between said drive member and movable member is provided with a friction force producing unit which can adjust magnitude of a friction force produced at a contact surface between said drive member and movable member.

12. A movable stage utilizing an electromechanical transducer claimed in claim 11, wherein magnitude of a friction force produced by said friction force producing unit can be adjusted from the surface side of the movable table or from the external side of the base frame.

13. A movable stage utilizing an electromechanical transducer claimed in claim 1, wherein said movable table is coupled with said movable member so that it can integrally move with said movable member in its moving direction and relatively move in the direction perpendicular to the moving direction of said movable member.

14. A movable stage utilizing an electromechanical transducer claimed in claim 1, wherein said movable table is coupled with said movable member so that it can integrally move with said movable member in its moving direction and relatively move in the direction other than the moving direction of said movable member.

15. A movable stage utilizing an electromechanical transducer, comprising:
    a base frame having a first guiding portion extended in a first direction and a second guiding portion extended in a second direction crossing the first direction;
    a first supporting member moving along said first guiding portion;
    a second supporting member moving along said second guiding portion;
    a first electromechanical transducer one end of which is fixed to said first supporting member to linearly expand and contract in said second direction;

a second electromechanical transducer one end of which is fixed to said second supporting member to linearly expand and contract in said first direction;

a first drive member fixed to the other end of said first electromechanical transducer so as to be linearly displaced in said second direction in accordance with the expansion and contraction of said first electromechanical transducer;

a second drive member fixed to the other end of said second electromechanical transducer so as to be linearly displaced in said first direction in accordance with the expansion and contraction of said second electromechanical transducer;

a movable member friction-coupled with said first and second drive members to move in said first and second directions; and a drive controller for controlling said first electromechanical transducer to move said movable member in said second direction and controlling said second electromechanical transducer to move said movable member in said first direction.

16. A movable stage utilizing an electromechanical transducer claimed in claim 15, further comprising a current supplying circuit for supplying a drive current to drive said first and second electromechanical transducer, and wherein said drive controller controls said first and second electromechanical transducer by controlling a drive current supplied from said current supplying circuit.

17. A movable stage utilizing an electromechanical transducer claimed in claim 15, wherein said drive controller controls drive of said electromechanical transducer so that it provides different rates of expanding and compressing displacement depending on the moving direction of said movable table.

18. A movable stage utilizing an electromechanical transducer claimed in claim 15, further comprising a position detector for detecting position of said movable table for the base frame, whereby said drive controller controls drive of said electromechanical transducer depending on detection result of said position detector.

19. A movable stage utilizing an electromechanical transducer claimed in claim 15, wherein a coupling portion between said movable member and movable table is formed symmetrical to the axial line in the driving direction of said drive member.

20. A movable stage utilizing an electromechanical transducer claimed in claim 15, wherein each of said electromechanical transducers is provided within a hermetically sealed space.

21. A movable stage utilizing an electromechanical transducer claimed in claim 20, wherein said hermetically sealed space in which said electromechanical transducer is provided is filled with a dry gas.

22. A movable stage utilizing an electromechanical transducer claimed in claim 15, further comprising regulating member for regulating the movable range of said movable table to regulate the movable range of the movable table for said base frame.

23. A movable stage utilizing an electromechanical transducer claimed in claim 15, wherein a friction-coupled portion between said drive member and movable member is provided with a friction force producing means which can adjust magnitude of a friction force produced at a contact surface between said drive member and movable member.

24. A movable stage utilizing an electromechanical transducer claimed in claim 23, wherein magnitude of a friction force produced by said friction force producing means can be adjusted from a surface side of the movable table or from the external side of the base frame.

25. A movable stage utilizing an electromechanical transducer, comprising:

a base frame having a first guiding portion extending in a first direction and a second guiding portion extended in a direction crossing the first direction;

a first supporting member moving along said first guiding portion;

a second supporting member moving along said second guiding portion;

a first electromechanical transducer one end of which is fixed to said first supporting member;

a second electromechanical transducer one end of which is fixed to said second supporting member;

a first drive member fixed to the other end of said first electromechanical transducer;

a second drive member fixed to the other end of said second electromechanical transducer;

a first movable member provided to be friction-coupled with said first and second drive members to move in said first and second directions;

a third supporting member provided on said first movable member to have a guiding portion along a third direction crossing said first and second directions;

a third electromechanical transducer one end of which is fixed to said third supporting member;

a third drive member fixed to the other end of said third electromechanical transducer;

a second movable member friction-coupled with said third drive member to move in said third direction;

a movable table coupled with said second movable member to move in said third direction; and a drive controller for controlling said first and second electromechanical transducer to move said first movable member in the first and second directions and also controlling said third electromechanical transducer to move said second movable member in the third direction.

26. A movable stage utilizing an electromechanical transducer claimed in claim 25, further comprising a current supplying circuit for supplying a drive current to drive said first to third electromechanical transducers, and wherein said drive controller controls said first to third electromechanical transducers by controlling a drive current supplied from said current supplying circuit.

27. A movable stage utilizing an electromechanical transducer claimed in claim 25, wherein said drive controller controls said first to third electromechanical transducer to show different rates of expanding and compressing displacements depending on the moving direction of said first to third movable members.

* * * * *